United States Patent
Omiya et al.

(10) Patent No.: US 10,909,360 B2
(45) Date of Patent: Feb. 2, 2021

(54) INFORMATION PROCESSING DEVICE, CONTROL METHOD OF INFORMATION PROCESSING DEVICE, AND STORAGE MEDIUM

(71) Applicant: SEIKO EPSON CORPORATION, Tokyo (JP)

(72) Inventors: Hidehisa Omiya, Matsumoto (JP); Yuichi Sugiyama, Matsumoto (JP); Masaru Koda, Ueda (JP); Cao Le, Shiojiri (JP); Toshiki Gonda, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 16/196,466

(22) Filed: Nov. 20, 2018

(65) Prior Publication Data
US 2019/0163972 A1 May 30, 2019

(30) Foreign Application Priority Data
Nov. 24, 2017 (JP) ................ 2017-226114

(51) Int. Cl.
*G06K 9/00* (2006.01)
*G06F 3/12* (2006.01)
(Continued)

(52) U.S. Cl.
CPC ....... *G06K 9/00469* (2013.01); *G06F 3/1203* (2013.01); *G06F 3/1273* (2013.01);
(Continued)

(58) Field of Classification Search
CPC .......... G06K 9/00469; G06K 9/00442; G06K 9/00449; G06K 9/00456; G06K 9/00463;
(Continued)

(56) References Cited

U.S. PATENT DOCUMENTS 9,396,540 B1 * 7/2016 Sampson ........... G06K 9/00463
10,445,571 B1 * 10/2019 Gaeta ................. G06K 9/00469
(Continued)

FOREIGN PATENT DOCUMENTS

JP 2012-027633 A 2/2012

OTHER PUBLICATIONS

Extended European Search Report issued in EP Appl. No. 18207764.4 dated Apr. 3, 2019 (8 pages).

*Primary Examiner* — Sean T Motsinger
(74) *Attorney, Agent, or Firm* — Chip Law Group

(57) ABSTRACT

A control server which includes a control server controller which, on a screen for displaying print text data according to a layout according to which receipt information is printed on a paper, displays a plurality of setting items corresponding to an extraction item as a setting menu and receives selection of the setting item in a state where selection of extraction item related text is received and the extraction item related text is selected, sets the extraction item related text as item value text in a case where an item value setting item is selected, generates an extraction condition for extracting the item value text from print text data based on at least one of a relative position of the item value text in the print text data and an attribute of the item value text, and extracts text matching the generated extraction condition as the item value text.

13 Claims, 19 Drawing Sheets

(51) Int. Cl.
*G06F 16/30* (2019.01)
*G06F 40/151* (2020.01)

(52) U.S. Cl.
CPC ............ *G06F 3/1285* (2013.01); *G06F 16/30* (2019.01); *G06F 40/151* (2020.01); *G06K 9/00442* (2013.01); *G06K 9/00449* (2013.01); *G06K 9/00456* (2013.01); *G06K 9/00463* (2013.01)

(58) Field of Classification Search
CPC .... G06F 3/1203; G06F 3/1273; G06F 3/1285; G06F 40/151; G06F 16/30
See application file for complete search history.

(56) References Cited

U.S. PATENT DOCUMENTS

| | | | |
|---|---|---|---|
| 2005/0243370 A1* | 11/2005 | Imai | G06F 3/1285 358/1.18 |
| 2007/0041041 A1* | 2/2007 | Engbrocks | G06F 3/1243 358/1.15 |
| 2010/0302604 A1* | 12/2010 | Kodimer | H04N 1/2179 358/474 |
| 2013/0238966 A1* | 9/2013 | Barrus | G06K 9/00449 715/223 |
| 2015/0193762 A1* | 7/2015 | Sugiyama | G06F 3/1204 705/24 |
| 2017/0068866 A1* | 3/2017 | Kostyukov | G06K 9/18 |
| 2017/0277902 A1* | 9/2017 | Bae | G06F 3/1454 |
| 2018/0032483 A1 | 2/2018 | Omiya et al. | |
| 2019/0163972 A1* | 5/2019 | Omiya | G06F 3/1285 |
| 2019/0188267 A1* | 6/2019 | Yoshioku | G06F 3/1244 |
| 2019/0279016 A1* | 9/2019 | Takabayashi | G06K 9/3233 |

* cited by examiner

| GENERAL IDENTIFICATION INFORMATION | SERIAL NUMBER | SHOP IDENTIFICATION INFORMATION | ISSUE DATE AND TIME INFORMATION | PRINT DATA | PRINT TEXT DATA | ANALYSIS DATA |
|---|---|---|---|---|---|---|
| J13 | J11 | J12 | J5 | | | |

@Back  @Remap All

Properties

| Cancel | Report | Shift |
|---|---|---|
| ✱ Printed at | 2017-10-05T14:24:34.000 | |
| ✱ Products | Select to see mapping details | |
| ✱ Receipt ID | Server | |
| ✱ Total | 35.36 | |
| ✓ Consumer ID | Not found | |
| ✓ Discounts | Not found | |
| ✓ Guests | 2 | |
| ✓ Is Refund | false | |
| ✓ Is Void | false | |
| ✓ Memberships | Not found | |
| ✓ Payment methods | Select to see mapping details | |
| ✓ Sales type | IN | |
| ✓ Staff | Select to see mapping details | |
| ✓ Subtotal | Not found | |
| ✓ Taxes | Select to see mapping details | |

✱ : Required  ✓ : Mapped

— M5a (points to top rows)
— M5b (points to bottom rows)
— G51

A51 / A52

Workflow Overview

Receipt — G52

Market street
Xxx Xxxxxxxx, XX 00000
000-000-0000

Server: Owner                Station: 1
Order #: 6701126363316/4406   Dine In
Table: 7                      Guests: 2
-----------------------------------------
1 mixed sandwich    5.00
1 pancake           3.00
1 shaved ice        1.50
3 cake              6.00
3 pudding           6.75
-----------------------------------------
Food SUB TOTAL:            22.25
Bar SUB TOTAL:             12.00
Tax 1:                      1.11
Tax 2                       0.67
TOTAL:                    $35.36

Visa Tendered:             35.36
-----------------------------------------
AIRMILE: 340
CHANGE:                     0.00

>> Ticket # 42 <<
SETTLED: 10/16/2017 02:59:37 PM
Thank you ! We hope to see you again!

15% Gratuity = $9.59
18% Gratuity = $9.71
20% Gratuity = $9.79
Coupon customers 35 plus
Thank you for your understanding!

- Back  ⊙ Remap All

Data Mapping

Total — B8a    B8b    B8c

⊗ Cancel    Remap    ⊙ Apply

G81 — Is this parse result value right?
If this value is wrong, please contact us via this form so we can help get this problem fixed.

TA8 — Total    35.36

A81    A82

Workflow Overview

G82

Receipt

Market street
Xxx Xxxxxxxx, XX 00000
000-000-0000

Server: Owner          Station: 1
Order #: 6701260333164406   Dine In
Table: 7               Guests: 2

1 mixed sandwich  5.00
1 pancake         3.00
1 shaved ice      1.50
3 cake            6.00
3 pudding         6.75

Food SUB TOTAL :           22.25
Bar SUB TOTAL :            12.00
Tax 1:                      1.11
Tax 2:                      0.67
TOTAL:                    $35.36

Visa Tendered:             35.36

AIRMILE: 340

CHANGE:                     0.00

>> Ticket #: 42 <<

INFORMATION PROCESSING DEVICE, CONTROL METHOD OF INFORMATION PROCESSING DEVICE, AND STORAGE MEDIUM

CROSS REFERENCES TO RELATED APPLICATIONS

The present invention claims priority to Japanese Application No. 2017-226114 filed on Nov. 24, 2017 which are hereby incorporated by reference in their entirety.

BACKGROUND

1. Technical Field

The present invention relates to an information processing device, a control method of the information processing device, and a storage medium.

2. Related Art

In the related art, there is known a technology for converting output data output from an accounting processor in a POS terminal into data in a format interpretable by an external device, transmitting the converted data to the external device, and managing the transmitted data with the external device (see, for example, JP-A-2012-27633).

Here, in the POS terminal that executes processing based on accounting, like the POS terminal according to JP-A-2012-27633 described above, the POS terminal or a print device connected to the POS terminal issues a receipt depending on the accounting. Various pieces of information such as information on accounting are printed on the receipt. Then, like information printed on the receipt, information printed on a printing medium may contain useful information that can be utilized later. Base on this, analysis of text data in which information to be printed on the printing medium is described as text is performed by the information processing device. Although such analysis includes extraction of text from text data, it is necessary for the user to perform the extraction, but the extraction is a heavy burden.

SUMMARY

An advantage of some aspects of the invention is to simplify an operation to be performed by a user for extraction of text by an information processing device.

According to an aspect of the invention, there is provided an information processing device which extracts text matching an extraction condition from data in which information printed on a printing medium is described in text, and includes a processor that receives selection of first text related to an extraction item from among the data after the data is displayed corresponding to a layout on which the information is printed on the printing medium, receives selection of a setting item after a plurality of setting items corresponding to the extraction item are displayed as a menu in a state where the first text is selected and generates an item value as the extraction condition for extracting second text from the data based on at least one of a relative position of the first text in the data and an attribute of the first text in a case where the item value is selected, the item value being contained in the setting item, and extracts text matching the generated extraction condition as the second text from the data.

Accordingly, a user becomes able to generate a new extraction condition by performing a simple operation of selecting first text related to an extraction item from among the data and selecting an item value as a setting item from a menu. That is, for the extraction condition of text by the information processing device, an operation to be performed by the user can be simplified.

BRIEF DESCRIPTION OF THE DRAWINGS

One aspect of the invention will be described with reference to the accompanying drawings, wherein like numbers reference like elements.

FIG. 7 is a diagram illustrating an example of an analysis data management database.

FIG. 10 is a view illustrating an example of a fifth user interface.

FIG. 16 is a view illustrating an example of an eighth user interface.

DESCRIPTION OF EXEMPLARY EMBODIMENTS

Figure 1:
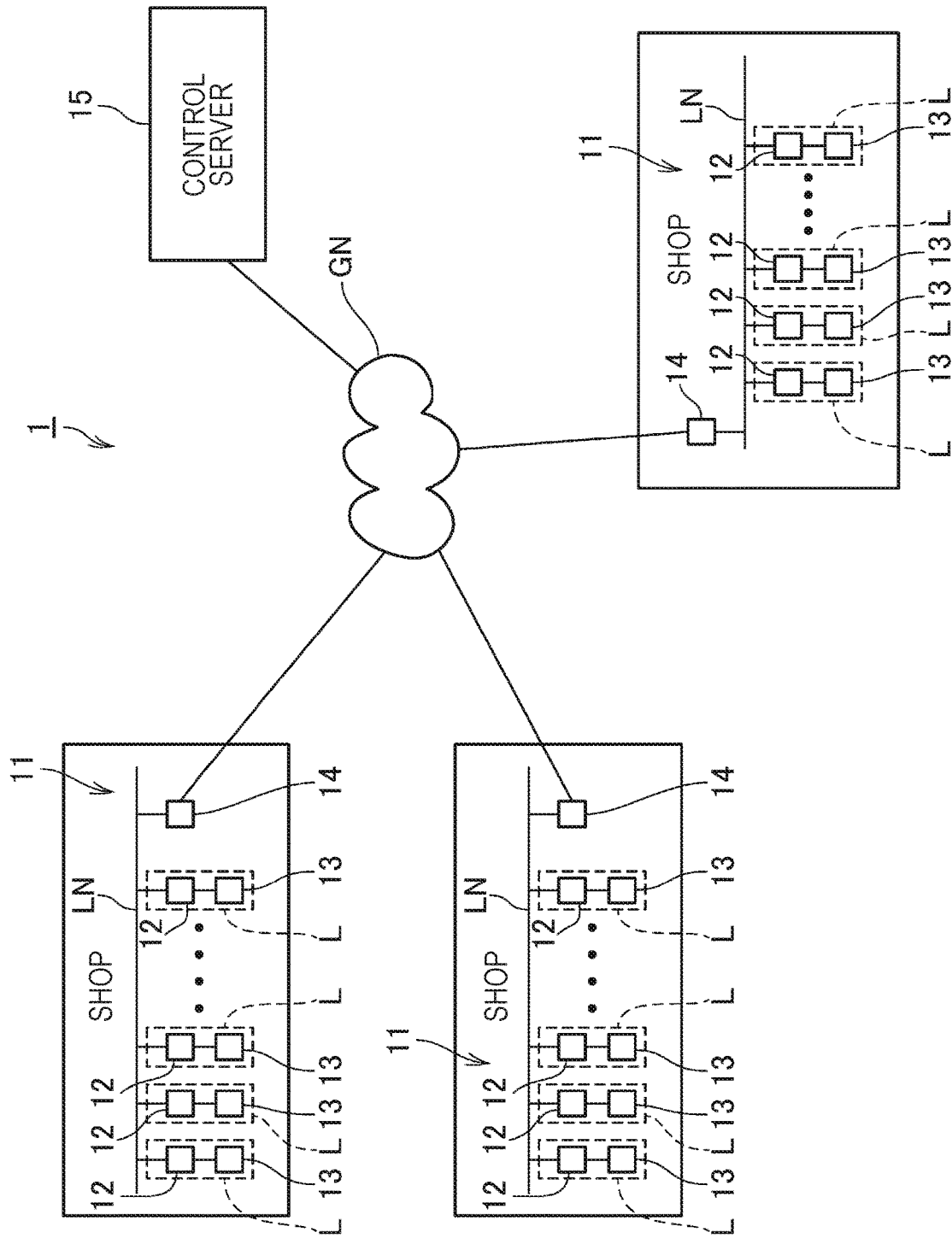
FIG. 1 is a diagram illustrating a configuration of an information processing system according to an embodiment.

FIG. 1 is a diagram illustrating a configuration of an information processing system 1 according to an embodiment.

As illustrated in FIG. 1, the information processing system 1 includes a plurality of shop systems 11. The shop system 11 is a system used for shops such as a supermarket, a convenience store, a department store, a restaurant, and the like. The shop may be a facility where provision of a commodity is performed and accounting is performed by a customer in accordance with the provision of the commodity. In the embodiment, the "commodity" means not only a product delivered to a customer as an object but also a target to be provided to customers in exchange for a price such as services provided to the customer, foods and drinks provided to the customer, and the like.

The shop system 11 has a function of performing accounting according to a commodity purchased by a customer, a function of issuing a receipt according to accounting, and the like.

A shop to which the shop system 11 is applied is provided with a counter L for allowing the customer to perform accounting. The counter L is provided with a print device 12 having a function of printing on roll paper (printing medium). The counter L is provided with a POS terminal 13 that is communicably connected to the print device 12 and controls the print device 12.

In accounting at the counter L, a person in charge reads a bar code attached to a commodity or a package of the commodity with a bar code reader BR connected to the print device 12, and inputs corresponding to accounting to the POS terminal 13. The print device 12 transmits data based on reading by the bar code reader BR to the POS terminal 13. The POS terminal 13 controls the print device 12 to cause the print device 12 to issue a receipt, based on data based on the reading by the bar code reader BR received from the print device 12 and input corresponding to accounting by the person in charge. The receipt issued by the print device 12 is delivered to the customer by the person in charge.

Configurations and functions, and processing based on the functions of the print device 12 and the POS terminal 13 will be described later.

The shop system 11 includes a local area network LN. The print device 12 is connected to the local area network LN. A communication device 14 is connected to the local area network LN. The communication device 14 is an interface device that connects the local area network LN to a global network GN including the Internet, a telephone network, and other communication networks. The communication device 14 has a function related to a modem or an optical network unit (ONU), a router function, a network address translation (NAT) function, a dynamic host configuration protocol (DHCP) server function, and the like. The communication device 14 transmits data to be transmitted and received between devices when communicating between a device connected to the local area network LN and a device connected to the global network GN. In FIG. 1, the communication device 14 is represented by one block, but the communication device 14 may be configured to include a plurality of devices according to the function.

The print device 12 can access the global network GN via the communication device 14.

A control server 15 (information processing device) is connected to the global network GN. The control server 15 is a server device capable of communicating with the print device 12. That is, the control server 15 executes predetermined arithmetic processing by using a request from a client or the like as a trigger. The control server 15 transmits data based on the result of the arithmetic processing to the client as needed. In FIG. 1, the control server 15 is represented by one block, but this does not mean that the control server 15 is constituted by a single server device. For example, the control server 15 may be configured to include a plurality of server devices. That is, the control server 15 may take any form as long as it can execute various processing to be described later.

Figure 2:
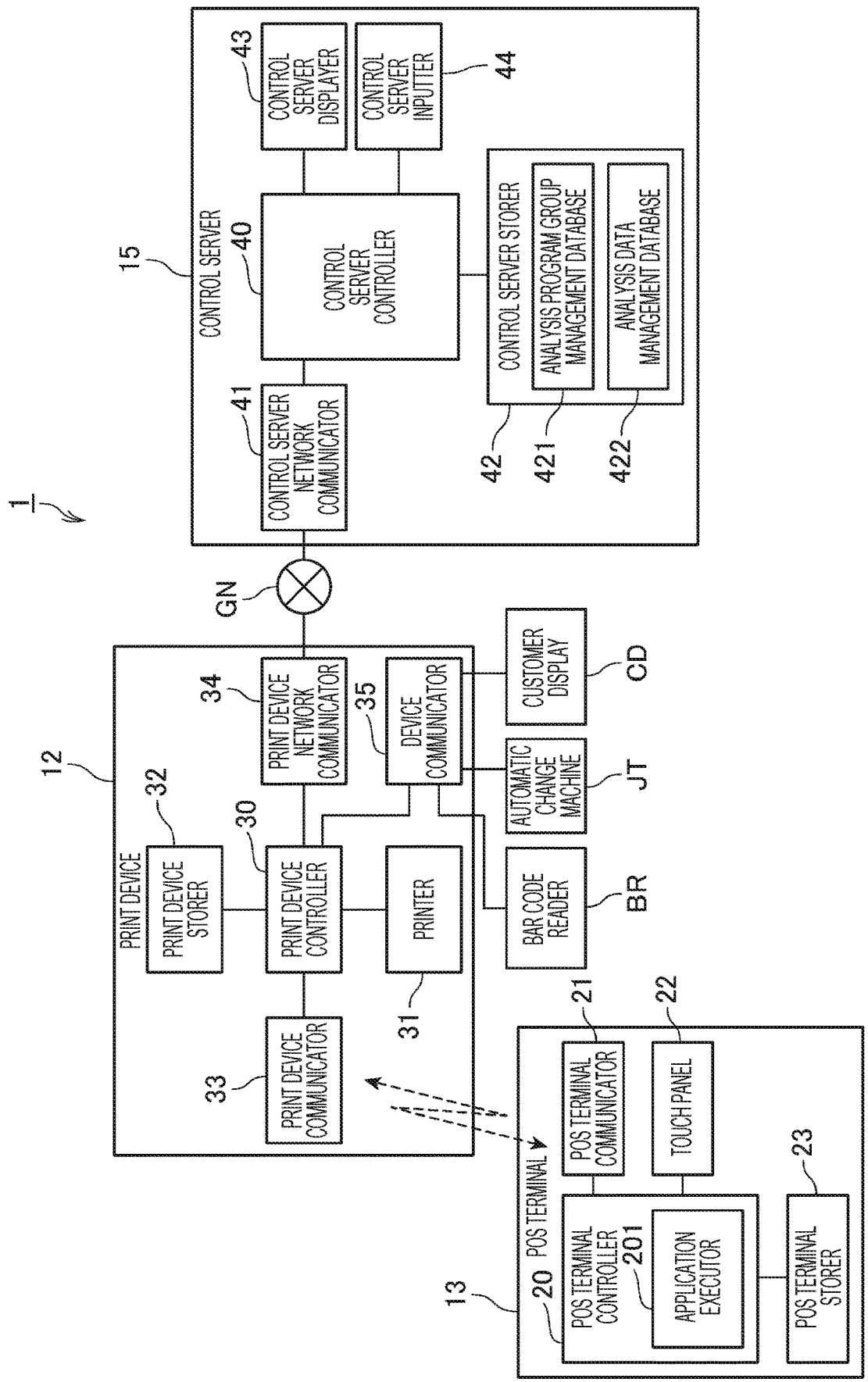
FIG. 2 is a block diagram illustrating a functional configuration of each device of the information processing system.

FIG. 2 is a block diagram illustrating a functional configuration of each device included in the information processing system 1.

The POS terminal 13 is, for example, a tablet type (plate-like) terminal provided with a touch panel 22 in a wide front area. The POS terminal 13 may be a desktop type stationary terminal or the like. In accounting at the counter L, the POS terminal 13 functions as a host computer that controls the print device 12 by executing various processing related to accounting.

As illustrated in FIG. 2, the POS terminal 13 includes a POS terminal controller 20, a POS terminal communicator 21, a touch panel 22, and a POS terminal storer 23.

The POS terminal controller 20 includes a processor (not illustrated) such as a CPU, a ROM, a RAM, an ASIC, a signal processing circuit, and the like, and controls each component of the POS terminal 13. The POS terminal controller 20 executes processing by cooperation of hardware and software in such a way that a processor such as a CPU reads a program stored in a ROM onto a RAM and executes processing, executes processing by a function installed in, for example, an ASIC, executes processing by performing signal processing by, for example, a signal processing circuit, and the like. In the POS terminal 13, a predetermined application is installed in advance. The POS terminal controller 20 functions as an application executor 201 by reading and executing the predetermined application, a program (OS, API, plug-in, and the like) attached to the predetermined application, and other programs.

Under control of the POS terminal controller 20, the POS terminal communicator 21 communicates with the print device 12 according to a predetermined communication standard. The POS terminal communicator 21 of the embodiment communicates with the print device 12 according to a predetermined wireless communication standard. The wireless communication standard of communication performed between the POS terminal 13 and the print device 12 may be any standard such as a wireless LAN standard corresponding to the ad hoc mode, a wireless LAN corresponding to the infrastructure mode, a standard related to short-range wireless communication such as Bluetooth (registered trademark), and the like. The POS terminal communicator 21 may communicate with the print device 12 according to a predetermined wired communication standard.

The touch panel 22 includes a display panel such as a liquid crystal display panel and a touch sensor overlapped or integrally provided on the display panel. The display panel displays various images under the control of the POS terminal controller 20. The touch sensor detects touch operation and outputs the touch operation to the POS terminal controller 20. The POS terminal controller 20 executes processing corresponding to the touch operation based on input from the touch sensor.

The POS terminal storer 23 includes a nonvolatile memory and stores various pieces of data.

The print device 12 is a thermal printer that accommodates roll paper, forms dots with a line type thermal head on the accommodated roll paper, and prints characters, images, and the like. Although a printing method of the print device 12 according to the embodiment is a thermal method, the printing method of the print device 12 is not limited to the thermal method, and other printing methods such as an ink jet method may be used. Further, a print head of the print device 12 is not limited to a line type print head, and may be a serial type print head.

As illustrated in FIG. 2, the print device 12 includes a print device controller 30, a printer 31, a print device storer 32, a print device communicator 33, a print device network communicator 34, and a device communicator 35.

The print device controller 30 includes a processor (not illustrated) such as a CPU, a ROM, a RAM, an ASIC, a signal processing circuit, and the like, and controls each component of the print device 12. The print device controller 30 executes processing by cooperation of hardware and software in such a way that a processor such as a CPU reads a program stored in the ROM and executes processing, executes processing by a function installed in, for example, an ASIC, executes processing by performing signal processing by, for example, a signal processing circuit, and the like.

The printer 31 includes various mechanisms relating to printing on roll paper such as a transport mechanism for transporting the roll paper accommodated in a casing of the print device 12, a printing mechanism for forming dots on the roll paper by the thermal head and printing the image, a cutting mechanism for cutting the roll paper at a predetermined position. Under the control of the print device controller 30, the printer 31 transports the roll paper by the transport mechanism, prints the image related to the receipt on the roll paper by the printing mechanism, cuts the roll paper at the predetermined position by the cutting mechanism, and issues a receipt.

The print device storer 32 includes a nonvolatile memory and stores various data.

The print device communicator 33 communicates with the POS terminal 13 according to a predetermined communication standard, under the control of the print device controller 30. In the embodiment, the print device communicator 33 communicates with the POS terminal 13 according to a predetermined wireless communication standard. The wireless communication standard of communication performed between the POS terminal 13 and the print device 12 may be any standard such as a wireless LAN standard corresponding to the ad hoc mode, a wireless LAN standard corresponding to the infrastructure mode, a standard related to short-range wireless communication such as Bluetooth, and the like. The print device communicator 33 may communicate with the POS terminal 13 according to a predetermined wired standard.

Under the control of the print device controller 30, the print device network communicator 34 communicates with devices (including control server 15) connected to the global network GN according to a predetermined communication standard. The communication standard used by the print device network communicator 34 for communication may be any standard such as HTTP, WebSocket or the like.

The device communicator 35 includes a port conforming to the USB standard, a port conforming to the serial communication standard (RS232C or the like) other than the USB standard, a port conforming to the parallel communication standard (IEEE 1284 or the like), a port conforming to a communication standard related to the wired LAN (Ethernet (Registered Trademark) and the like), and an interface board having other ports. A device can be connected to each port. The device communicator 35 communicates with a device connected to the print device 12 via the port, under the control of the print device controller 30.

The device communicator 35 may be configured to have a wireless communication function and wirelessly communicate with the device.

A bar code reader BR, a customer display CD, and an automatic change machine JT as devices are connected to the print device 12.

The bar code reader BR reads the bar code attached to the commodity, the package of the commodity, and the like, and outputs data indicating the reading result to the device communicator 35. The device communicator 35 outputs data input from the bar code reader BR to the print device controller 30.

The customer display CD displays information on accounting under the control of the print device controller 30. The information displayed on the customer display CD can be seen by the customer who performs accounting at the counter L.

The automatic change machine JT includes a money receiving port for inputting money received from a customer and a change discharging port for discharging money relating to change, and discharges the corresponding change from the change discharging port when money is input through the money receiving port, under the control of the print device controller 30.

As illustrated in FIG. 2, the control server 15 includes a control server controller 40 (controller), a control server network communicator 41 (connector), a control server storer 42, a control server displayer 43, and a control server inputter 44.

The control server controller 40 includes a processor (not illustrated) such as a CPU, a ROM, a RAM, an ASIC, a signal processing circuit, and the like, and controls each component of the control server 15. The control server controller 40 executes processing by cooperation of hardware and software in such a way that a processor such as a CPU reads a program stored in a ROM or the control server storer 42 onto a RAM and executes processing, executes processing by a function installed in, for example, an ASIC, executes processing by performing signal processing by, for example, a signal processing circuit, and the like.

Under the control of the control server controller 40, the control server network communicator 41 communicates with the devices (including print device 12) communicably connected to the global network GN according to a predetermined communication standard. The communication standard to be used by the control server network communicator 41 for communication may be any standard such as HTTP, WebSocket or the like.

The control server storer 42 includes a nonvolatile memory and stores various pieces of data. The control server storer 42 stores an analysis program group management database 421 and an analysis data management database 422. These databases will be described later.

The control server displayer 43 includes a display panel and displays various pieces of information on the display panel under the control of the control server controller 40.

The control server inputter 44 includes a keyboard, a mouse, and other input means, detects a user's operation on the input means, and outputs the detected operation to the control server controller 40. Based on the input from the control server inputter 44, the control server controller 40 executes processing corresponding to the user's operation on the input means.

Next, operations of the POS terminal 13, the print device 12, and the control server 15 in the case where customer's accounting is performed at the counter L will be described.

Figure 3:
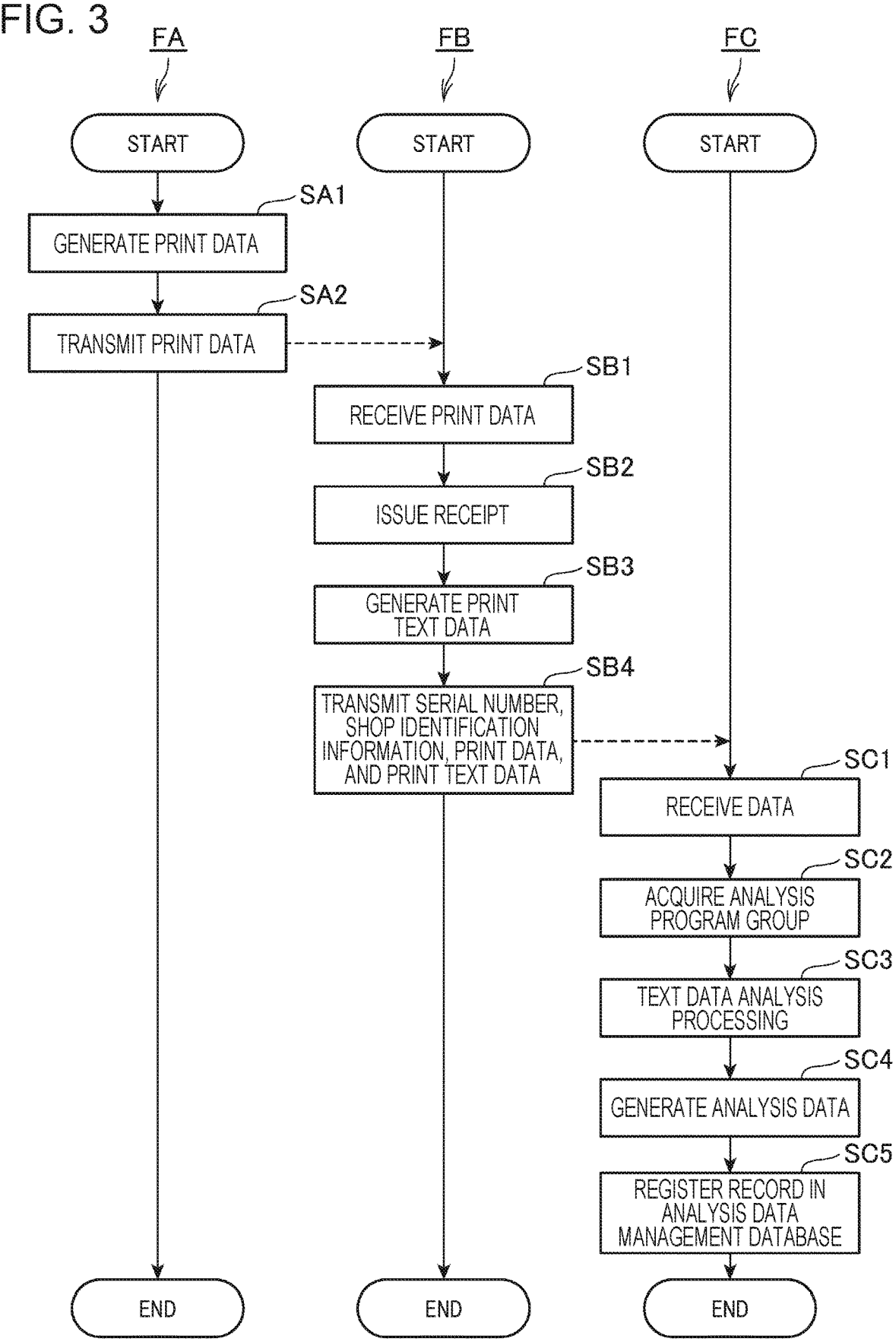
FIG. 3 is a flowchart illustrating operations of a POS terminal, a print device, and a control server.

FIG. 3 is a flowchart illustrating operations of the POS terminal 13, the print device 12, and the control server 15 in the case where customer's accounting is performed at the counter L. The flowchart FA in FIG. 3 illustrates the operation of the POS terminal 13, the flowchart FB illustrates the operation of the print device 12, and the flowchart FC illustrates the operation of the control server 15.

As illustrated in the flowchart FA of FIG. 3, an application executor 201 of the POS terminal controller 20 of the POS terminal 13 executes accounting processing according to customer's accounting, and generates print data based on the accounting processing (Step SA1).

When describing processing in Step SA1 in detail, the application executor 201 causes the touch panel 22 to display a user interface capable of allowing input corresponding to accounting. The application executor 201 generates receipt information in response to an input by a person in charge to the touch panel 22 or an input from the print device 12 accompanying accounting of the customer. The receipt information is information to be printed on a receipt by causing the print device 12 to issue the receipt. The specific contents of the receipt information will be described later by giving an example. Next, the application executor 201 generates print data based on the generated receipt information. The print data is data for printing receipt information with a predetermined layout and instructing issuance as a receipt. The print data is configured to include a plurality of control commands according to a command system of the print device 12.

Figure 4:
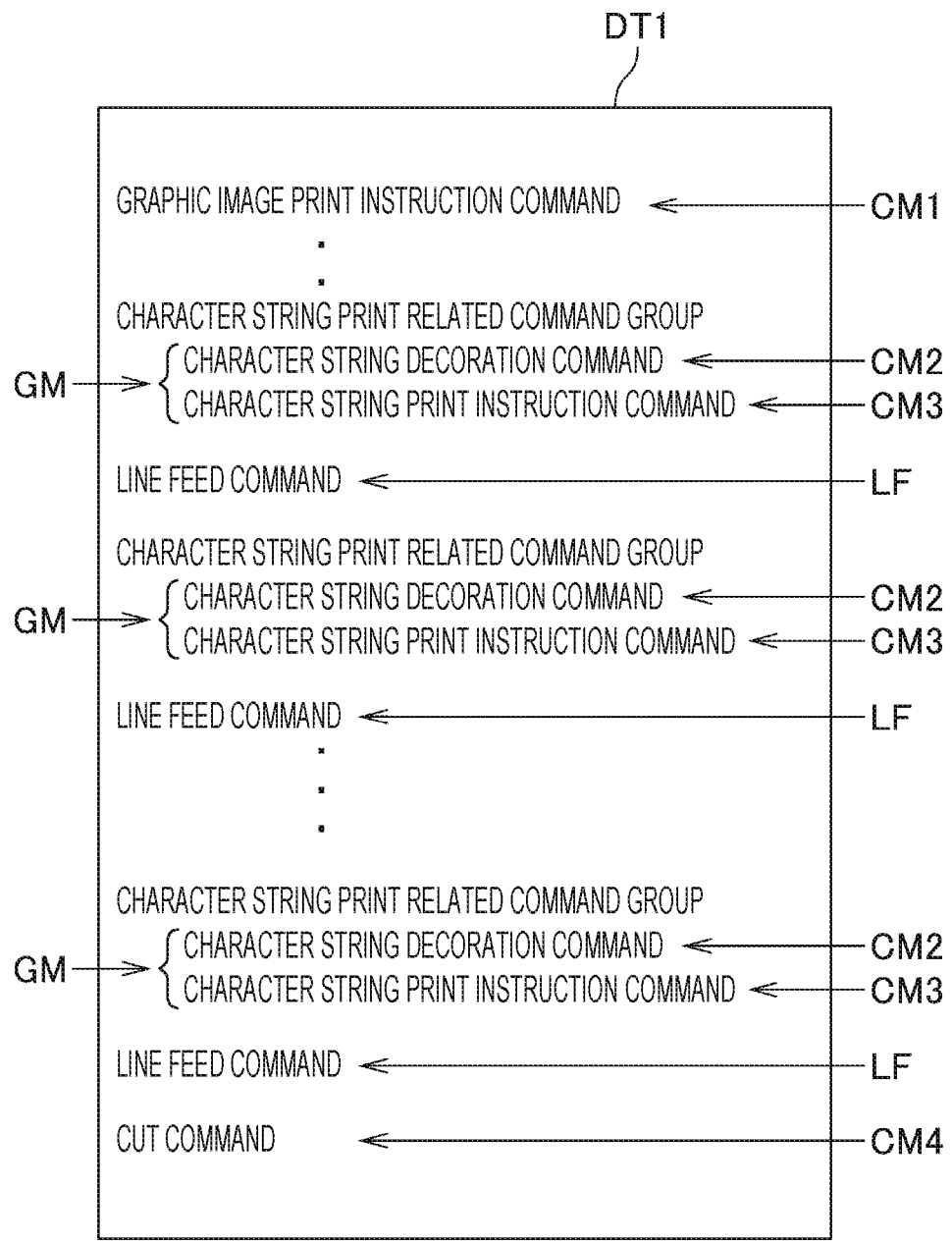
FIG. 4 is a view illustrating an example of print data.

FIG. 4 is a view illustrating print data DT 1 which is an example of print data.

As illustrated in FIG. 4, print data DT1 includes a graphic image print instruction command CM1, a character string print related command group GM, a line feed command LF, and a cut command CM4. The character string print related command group GM includes a character string decoration command CM2 and a character string print instruction command CM3.

The graphic image print instruction command CM1 includes a dedicated instruction code and image data such as bit map data, and is a control command instructing printing of a graphic image based on image data. The image data is data that holds information on a color of each dot with respect to dots arranged in a dot matrix form. The graphic image is not an image printed based on font data but an image to be printed on the basis of image data received from a device (in the embodiment, the POS terminal 13) functioning as a host computer. Logo information J1 which will be described later corresponds to a graphic image.

The character string print instruction command CM3 included in the character string print related command group GM is a control command for instructing printing of a character string for one line. The character string print instruction command CM3 includes a dedicated instruction code and information (combination of character codes of one or a plurality of characters constituting a character string) of a character string instructing printing. The character string decoration command CM2 included in the character string print related command group GM is a control command for instructing designation of decoration to be applied to a character string instructed to be printed by the character string print instruction command CM3. Examples of the decoration to be applied to the character string include right alignment, center alignment, left alignment, displaying as a bold character, addition of underline, addition of emphasis point, inversion of black and white, rotation, enlargement, reduction, and the like.

The print device storer 32 of the print device 12 stores font data of each printable character. In printing the character string based on one character string print related command group GM, the print device controller 30 of the print device 12 executes the following processing. First, the print device controller 30 converts each of character codes included in the character string print instruction command CM3 included in the one character string print related command group GM into corresponding each piece of font data by a predetermined means. Next, the print device controller 30 applies decoration designated by the character string decoration command CM2 included in the one character string print related command group GM to each piece of font data, and develops each piece of font data in an image buffer. Next, the print device controller 30 controls the printer 31 based on each piece of font data developed in the image buffer to print a character string for one line.

The line feed command LF is a command for instructing line feed. The cut command CM4 is a command for instructing cutting of roll paper.

As illustrated in the flowchart FA of FIG. 3, after generating print data in Step SA1, the application executor 201 controls the POS terminal communicator 21 and transmits the generated print data to the print device 12 (Step SA2).

As illustrated in the flowchart FB of FIG. 3, the print device controller 30 of the print device 12 controls the print device communicator 33 to receive the print data (Step SB1). Next, the print device controller 30 controls the printer 31 to issue a receipt, based on the print data received in Step SB1, (Step SB2). The issued receipt is delivered to the customer.

Figure 5A:
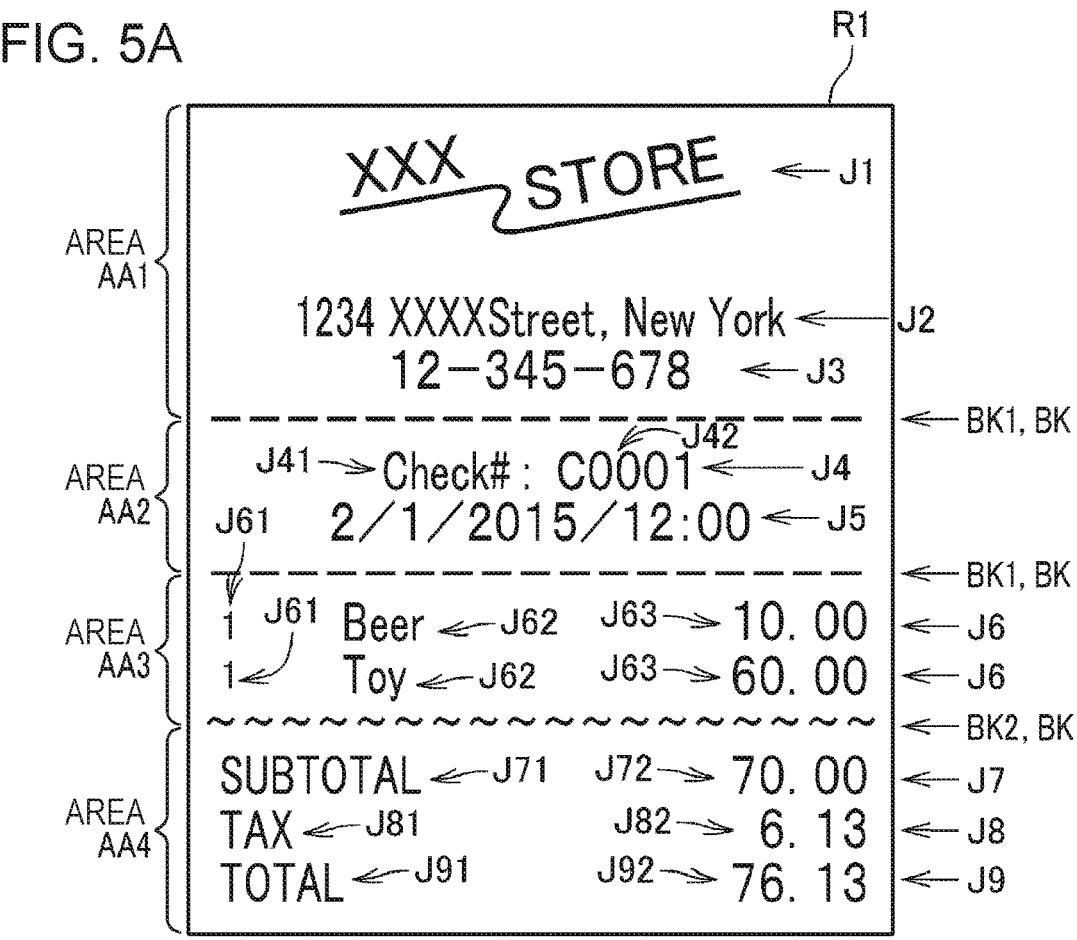
FIG. 5A is a view illustrating an example of a receipt.

An example of the receipt issued by the print device 12 based on print data is illustrated in FIG. 5A.

In this embodiment, a target to which a character code is assigned is referred to as "character". The character includes a symbol to which a character code is assigned and a space character to which a character code is assigned.

In a receipt R1 exemplified in FIG. 5A, logo information J1 designing a name of a shop is printed at the head thereof. The logo information J1 is printed based on the graphic image print instruction command CM1 described above.

In the receipt R1, below the logo information J1, shop address information J2 representing an address of the shop by character string is printed in one line. The shop address information J2 is printed based on the character string print related command group GM including the character string decoration command CM2 for instructing designation of decoration relating to center alignment and the character string print instruction command CM3 for instructing printing of the character string representing the address of the shop.

In the receipt R1, shop telephone number information J3 representing the telephone number of the shop by character string is printed on one line below the shop address information J2 in one line. The shop telephone number information J3 is printed based on the character string print related command group GM including the character string decoration command CM2 for instructing designation of decoration relating to center alignment and the character string print instruction command CM3 for instructing printing of the character string representing the telephone number of the shop.

In the receipt R1, a first area division information BK1 is printed on one line below the shop telephone number information J3. The first area division information BK1 is a character string composed of a predetermined number of consecutive characters "-" within one line. In the receipt R1, a print area is delimited by the first first area division information BK1, and an area above the first first area division information BK1 is divided into areas. Hereinafter, in the receipt R1, an area (an area including logo information J1, shop address information J2, and shop telephone number information J3) above the first area division information BK1 is set to an "area AA1".

In the receipt R1, receipt identification related information J4 is printed one line below the first first area division information BK1. The receipt identification related information J4 includes receipt identification information J42 which indicates identification information for identifying the receipt in a character string. A value of the receipt identification information J42 is different for each receipt. Further, the receipt identification related information J4 includes receipt identification specification information J41 which is printed in front of (on the left side in FIG. 5A) the receipt identification information J42 on the same line of the receipt identification information J42 and represents information specifying that the receipt identification information J42 is identification information for identifying the receipt with a character string. As illustrated in FIG. 5A, the receipt identification specification information J41 relating to the receipt R1 is information composed of a character string "Check#:". The receipt identification related information J4 is printed based on the character string print related command group GM including the character string decoration command CM2 for instructing designation of decoration relating to center alignment and the following character string print instruction command CM3. The character string print instruction command CM3 is a control command for instructing printing of a character string in which a character string representing the receipt identification specification information J41, one space character, and a character string representing the receipt identification information J42 are continuous.

In the receipt R1, on the one line below the receipt identification related information J4, issue date and time information J5 representing the date and time when the receipt was issued as a character string is printed. The issue date and time information J5 is printed based on the character string print related command group GM including the character string decoration command CM2 for instructing designation of decoration relating to center alignment and the character string print instruction command CM3 for instructing printing of a character string representing the date and time when the receipt was issued.

The first area division information BK1 is printed on one line below the issue date and time information J5. In the receipt R1, the print area is delimited by the first first area division information BK1 and a second first area division information BK1, and the area surrounded by these pieces of information is divided into areas. Hereinafter, in the receipt R1, an area surrounded by the first first area division information BK1 and the second first area division information BK1 is referred to as an "area AA2".

In the receipt R1, one piece or a plurality of (two in FIG. 5A) pieces of commodity information J6 are printed on one line below the second first area division information BK1. The commodity information J6 is information on the commodity purchased by the customer. The commodity information J6 is printed on the receipt R1 for each type of commodity purchased by the customer. Accordingly, for example, in a case where three types of commodities are purchased by the customer, three pieces of commodity information J6, each of which corresponding to each of three types of commodities, are printed. In a case where the plurality of pieces of commodity information J6 are printed on the receipt R1, the plurality of pieces of commodity information J6 are continuously printed one line at a time on different lines.

The commodity information J6 includes purchase quantity information J61, commodity name information J62, and unit price information J63. The purchase quantity information J61, the commodity name information J62, and the unit price information J63 are printed on the same line. The purchase quantity information J61 is information representing a purchase quantity of the corresponding commodity with a character string. The commodity name information J62 is information representing a name of the corresponding commodity with a character string. The unit price information J63 is information representing a unit price of the corresponding commodity as a character string.

The commodity information J6 is printed based on the character string print related command group GM including the character string decoration command CM2 for instructing designation of decoration relating to the left alignment and the following character string print instruction command CM3. The character string print instruction command CM3 is a control command for instructing printing of a character string in which a character string representing the purchase quantity information J61, one space character, and a character string representing the commodity name information J62, one or a plurality of space characters, and a character string representing the unit price information J63 are continuous. The number of space characters to be inserted between the character string representing the commodity name information J62 and the character string representing the unit price information J63 is adjusted such that the position of the unit price information J63 is positioned at the end of "line".

In the receipt R1, the second area division information BK2 is printed on one line below the commodity information J6 printed at the bottom. The second area division information BK2 is a character string composed of a predetermined number of consecutive characters "~" within one line. In the receipt R1, the print area is delimited by the second first area division information BK1 and the first second area division information BK2, and the area surrounded by these pieces of information is divided into areas. Hereinafter, in the receipt R1, the area surrounded by the second first area division information BK1 and the first second area division information BK2 is set to an "area AA3".

In the receipt R1, subtotal amount related information J7 is printed on one line below the first second area division information BK2. The subtotal amount related information J7 includes subtotal amount information J72 representing a subtotal amount in a character string. The subtotal amount related information J7 includes subtotal amount specification information J71 representing information which is printed in front of (on the left side in FIG. 5A) the subtotal amount information J72 on the same line of the subtotal amount information J72 and represents information specifying that the subtotal amount information J72 is information representing the subtotal amount with a character string. As illustrated in FIG. 5A, the subtotal amount specification information J71 relating to the receipt R1 is a character string composed of eight upper case alphabetic character string of "SUBTOTAL".

The subtotal amount related information J7 is printed based on the character string print related command group GM including the character string decoration command CM2 instructing designation of decoration relating to the left alignment and the following character string print instruction command CM3. The character string print instruction command CM3 is a control command for instructing printing of a character string in which a character string representing the subtotal amount specification information J71, one or a plurality of space characters, and a character string representing the subtotal amount information J72 are continuous. The number of space characters to be inserted between the character string representing the subtotal amount specification information J71 and the character string representing the subtotal amount information J72 is adjusted such that the position of the subtotal amount information J72 is positioned at the end of "line".

In the receipt R1, tax related information J8 is printed on one line below the subtotal amount related information J7. The tax related information J8 includes tax amount information J82 representing a tax amount with a character string. The tax related information J8 includes tax specification information J81 which is printed in front of (on the left side in FIG. 5A) the tax amount information J82 on the same line of the tax amount information J82 and represents information specifying that the tax amount information J82 is information indicating a tax amount with a character string. As illustrated in FIG. 5A, the tax specification information J81 relating to the receipt R1 is a character string composed of three upper case alphabetic character string of "TAX".

The tax related information J8 is printed based on the character string print related command group GM including the character string decoration command CM2 for instructing designation of decoration relating to the left alignment and the following character string print instruction command CM3. The character string print instruction command CM3 is a control command instructing printing of a character string in which a character string representing the tax specification information J81, one or a plurality of space characters, and a character string representing the tax amount information J82 are continuous. The number of space characters to be inserted between the character string representing the tax specification information J81 and the character string representing the tax amount information J82 is adjusted such that the position of the tax amount information J82 is positioned at the end of the "line".

In the receipt R1, total amount related information J9 is printed on one line below the tax related information J8. The total amount related information J9 includes total amount information J92 representing the total amount with a character string. The total amount related information J9 includes total amount specification information J91 representing information which is printed in front of (on the left side in FIG. 5A) the total amount information J92 on the same line of the total amount information J92 and represents information specifying that the total amount information J92 is information indicating the total amount with a character string. As illustrated in FIG. 5A, the total amount specification information J91 relating to the receipt R1 is a character string composed of five upper case alphabetic character string of "TOTAL".

The total amount related information J9 is printed based on the character string print related command group GM including the character string decoration command CM2 for instructing designation of decoration relating to the left alignment and the following character string print instruction command CM3. The character string print instruction command CM3 is a control command for instructing printing of a character string in which a character string representing the total amount specification information J91, one or a plurality of space characters, and a character string representing the total amount information J92 are continuous. The number of space characters to be inserted between the character string representing the total amount specification information J91 and the character string representing the total amount information J92 is adjusted such that the position of the total amount information J92 is positioned at the end of "line". Hereinafter, in the receipt R1, an area below the second area division information BK2 (area including subtotal amount related information J7, tax related information J8, and total amount related information J9) is set to an "area AA4".

In the following description, information indicated by a character string in which a plurality of special characters to be described later are consecutive in one line, such as the first area division information BK1 and the second area division information BK2, will be referred to as "area division information BK".

As such, receipt information is printed in the receipt R1 with the following layout. That is, three pieces of area division information BK are printed in the print area, and the print area is divided into four areas of an area AA1, an area AA2, an area AA3, and tan area AA4 in order from the top according to the three pieces of area division information BK. In the area AA1, the logo information J1, the shop address information J2, and the shop telephone number information J3 are printed in this order. In area AA2, receipt identification related information J4 and issue date and time information J5 are printed in this order. In the area AA3, one piece or a plurality of pieces of commodity information J6 are printed. The commodity information J6 is printed in the order of the purchase quantity information J61, the commodity name information J62, and the unit price information J63 toward the right within one line. In the area AA4, subtotal amount related information J7, tax related information J8, and total amount related information J9 are printed in this order.

When returning to the description of the flowchart FB in FIG. 3, the print device controller 30 generates print text data (text data, data) based on print data after issuing the receipt in Step SB2 (Step SB3). The print text data is text data in which receipt information to be printed as a character is described as text, among receipt information printed on roll paper based on the print data. Hereinafter, processing of Step SB3 will be described in detail.

In Step SB3, the print device controller 30 extracts a character string print instruction command CM3 which is a control command relating to printing of a character string and a line feed command LF from the print data. Next, based on the extracted control command, the print device controller 30 generates print text data in which receipt information printed as a character in the receipt is described as text. Here, the print device controller 30 describes receipt information in a state where line feed performed in printing is reflected in the print text data. Further, the print device controller 30 describes the receipt information in a state where decoration designated by the character string decoration command CM2 is not reflected in the print text data. Accordingly, even in a case where the center alignment or the right alignment is instructed as decoration to be applied to the character string by the character string decoration command CM2, these decorations are not reflected in description of the text in the print text data.

Figure 5B:
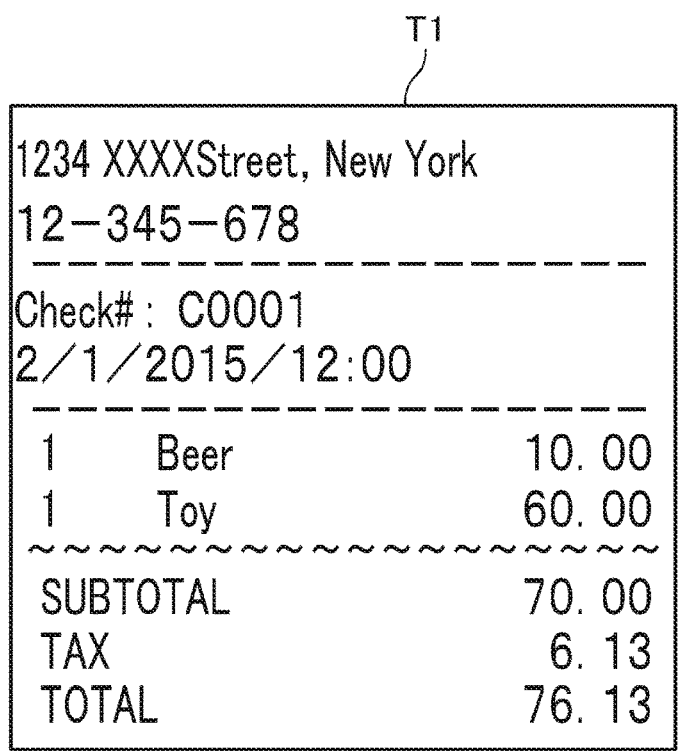
FIG. 5B is a view illustrating an example of print text data.

FIG. 5B is a view illustrating the contents of print text data T1 which is print text data generated based on the print data relating to the receipt R1 illustrated in FIG. 5A. As apparent from a comparison between FIG. 5B and FIG. 5A, in print text data T1, the receipt information printed as a character in the receipt R1 is described as text in a state where an order in printing and line feed in printing is reflected.

Since the logo information J1 is a graphic image, the logo information J1 is not described in the print text data. That is, information other than the characters printed based on font data corresponding to the character code is not described in the print text data.

As illustrated in the flowchart FB of FIG. 3, after generating the print text data in Step SB3, the print device controller 30 transmits a serial number J11, a shop identification information J12, print data received in Step SB1, and print text data generated in Step SB3 to the control server 15 (Step SB4). The serial number J11 is identification information uniquely assigned to the print device 12 at the manufacturing stage of the print device 12, and is stored in a predetermined storage area of the print device storer 32. In Step SB4, the print device controller 30 acquires the serial number J11 stored in the predetermined storage area of the print device storer 32. The shop identification information J12 is identification information for identifying the shop where the print device 12 is provided, and is stored in a predetermined storage area of the print device storer 32. In Step SB4, the print device controller 30 acquires the shop identification information J12 stored in the predetermined storage area of the print device storer 32.

In the embodiment, a configuration in which the print device 12 generates the print text data from the print data is illustrated, but a configuration in which the POS terminal 13 generates the print text data may be used. In this case, the print device 12 skips processing of Step SB3, and transmits print text data received from the POS terminal 13 to the control server 15 together with the serial number J11, the shop identification information J12, and the print data. Also, the control server 15 may be configured to acquire print data from the print device 12 and generate print text data.

In Step SB4, information on communication necessary for transmitting the serial number J11 and the like (information on a transmission destination, a protocol used for communication, a format of data to be transmitted, and the like) is registered in advance in the print device 12.

As illustrated in the flowchart FC of FIG. 3, the control server controller 40 of the control server 15 controls the control server network communicator 41 to receive the serial number J11, the shop identification information J12, the print data, and print text data that are transmitted by the print device 12 (Step SC1).

Next, the control server controller 40 refers to an analysis program group management database 421 and acquires an analysis program group BPG with which the serial number J11 having the same value as the value of the serial number J11 received in Step SC1 is associated (Step SC2).

Figure 6:
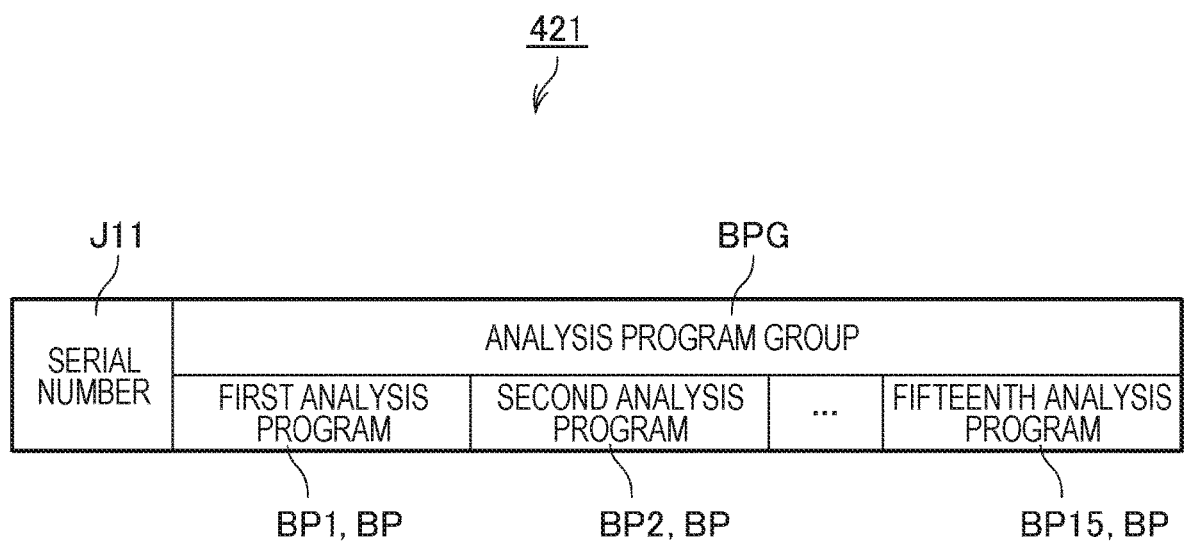
FIG. 6 is a diagram illustrating an example of an analysis program group management database.

FIG. 6 is a diagram schematically illustrating information included in one record of the analysis program group management database 421.

As illustrated in FIG. 6, one record in the analysis program group management database 421 includes the serial number J11 and the analysis program group BPG.

In FIG. 6, the analysis program group BPG includes fifteen analysis programs BP, that is, a first analysis program BP1 to a fifteenth analysis program BP15. The analysis program BP (the first analysis program BP1 to the fifteenth analysis program BP15) will be described later.

When returning to the description of the flowchart FC in FIG. 3, the control server controller 40 executes text data analysis processing based on the acquired analysis program group BPG (Step SC3).

The text data analysis processing (hereinafter also simply referred to as analysis processing) executes extraction processing of extracting text (hereinafter referred to as "item value text"), which represents an item value (item value of an extraction item) corresponding to an extraction item, from print text data. In the following, the item value indicated (meant) by the item value text extracted in the extraction processing is represented as an extraction item value (or simply item value). The extraction processing includes processing of detecting that the item value text (second text) can be extracted or that the item value text cannot be extracted. The text data analysis processing executes conversion processing for converting the item value text extracted in the extraction processing into a format desired by the user (format that can be utilized by the user) as needed. As such, the item value text includes item value text which does not require conversion processing and item value text which requires conversion processing. Accordingly, there are a case where the item value text becomes the extraction item value as it is, and a case where the item value text subjected to predetermined conversion processing becomes the extraction item value.

The extraction item indicates a target item for which the item value text is extracted (extraction item value is acquired) from the print text data.

In the embodiment, as extraction items, fifteen items of a customer identification information item, an accounting discount information item, a customer number information item, a refund presence/absence information item, a cancellation presence/absence information item, a membership information item, a payment method information item, an issue date and time information item, a commodity information item, a receipt identification information item, a sales method information item, a staff information item, a subtotal amount information item, a tax information item, and a total amount information item. These extraction items will be described in detail later.

As described above, the analysis program group BPG of the embodiment includes a plurality of analysis programs BP. One analysis program BP is a program described in a predetermined script language, and is a program having a function of executing extraction processing on print text data for one extraction item and executing conversion processing on the extracted item value text. The analysis program BP of the embodiment is defined by a processing flow in which an extraction condition that is a condition for extracting an item value text (second text) from print text data, and an analysis condition that is a condition for converting the extracted item value text into an extraction item value are described. Specific contents of the extraction condition and the analysis condition will be described later.

The analysis program group BPG acquires an extraction item value for an extraction item corresponding to the number of analysis programs BP from one print text data. In FIG. 6, the analysis program group BPG is composed of a first analysis program BP1 to a fifteenth analysis program BP15. That is, in the case of FIG. 6, the analysis program group BPG has a function of executing extraction of item value text and acquisition of extraction item value for each of the fifteen extraction items.

In the embodiment, the analysis program group BPG includes a first analysis program BP1 having a function of executing extraction of an item value text and acquisition of an extraction item value for the customer identification information item.

The analysis program group BPG includes a second analysis program BP2 having a function of executing extraction of an item value text and acquisition of an extraction item value for the accounting discount information item.

The analysis program group BPG includes a third analysis program BP3 having a function of executing extraction of an item value text and acquisition of an extraction item value for the customer number information item.

The analysis program group BPG includes a fourth analysis program BP4 having a function of executing extraction of an item value text and acquisition of an extraction item value for the refund presence/absence information item.

The analysis program group BPG includes a fifth analysis program BP5 having a function of executing extraction of an item value text and acquisition of an extraction item value for the cancellation presence/absence information item.

The analysis program group BPG includes a sixth analysis program BP6 having a function of executing extraction of an item value text and acquisition of an extraction item value for the membership information item.

The analysis program group BPG includes a seventh analysis program BP7 having a function of executing extraction of an item value text and acquisition of an extraction item value for the payment method information item.

The analysis program group BPG includes an eighth analysis program BP8 having a function of executing an extraction of item value text and acquisition of an extraction item value for the issue date and time information item.

The analysis program group BPG a ninth analysis program BP9 having a function of executing extraction of an item value text and acquisition of an extraction item value for the commodity information item.

The analysis program group BPG includes a tenth analysis program BP10 having a function of executing extraction of an item value text and acquisition of an extraction item value for the receipt identification information item.

The analysis program group BPG includes an eleventh analysis program BP11 having a function of executing extraction of an item value text and acquisition of an extraction item value for the sales method information item.

The analysis program group BPG includes a twelfth analysis program BP12 having a function of executing extraction of an item value text and acquisition of an extraction item value for the staff information item.

The analysis program group BPG includes a thirteenth analysis program BP13 having a function of executing extraction of an item value text and acquisition of an extraction item value for the subtotal amount information item.

The analysis program group BPG includes a fourteenth analysis program BP14 having a function of executing extraction of an item value text and acquisition of an extraction item value for the tax information item.

The analysis program group BPG includes a fifteenth analysis program BP15 having a function of executing extraction of an item value text and acquisition of an extraction item value for the total amount information item.

The text data analysis processing is executed by a control program installed in the control server 15 and a function of the program attached to the control program.

Although identifiers of 1 to 15 are attached to the analysis program BP, the identifier indicate that targeted extraction items are different. For that reason, for example, the first analysis program BP1 of a certain analysis program group BPG and the first analysis program BP1 of the analysis program group BPG different from the certain analysis program group BPG only have the same extraction items which are targeted and the extraction condition and the analysis condition are not necessarily the same.

When returning to the description of the flowchart FC in FIG. 3, the control server controller 40 generates analysis data based on the processing result of analysis processing in Step SC3 (Step SC4). Analysis data is JSON format data in which each extraction item described above, a general identification information item, a serial number item, and each shop identification information item, and an item value (extraction item value in the case of an extraction item) are described in association with each other. In analysis data, information (for example, null value) indicating that the item value text could not be extracted from the print text data is described for each extraction item as needed.

The general identification information item is an item associated with the general identification information J17, as the item value, uniquely identifying the analysis data. The serial number item is an item associated with the serial number J11 as the item value. The shop identification information item is an item associated with shop identification information J12, as an item value, for uniquely identifying a shop.

The customer identification information item is an extraction item associated with identification information (hereinafter referred to as "customer identification information"), as an item value, for identifying a customer who has made accounting. In accounting, a customer card in which customer identification information is recorded may be read and customer identification information may be printed on a receipt. In this case, receipt information includes customer identification information, and a character string indicating the customer identification information is described in the print text data.

An accounting discount name information item and an accounting discount amount information item belong to the accounting discount information item.

The accounting discount name information item is an extraction item associated with information (hereinafter referred to as "accounting discount name information"), as an item value, indicating a name of a discount applied to accounting. The accounting discount amount information item is an extraction item associated with information (hereinafter referred to as "accounting discount amount information"), as an item value, indicating the amount of discount applied to accounting. In accounting, a predetermined discount may be applied. In this case, in the receipt, accounting discount name information corresponding to a predetermined discount applied to accounting and accounting discount amount information may be printed on the receipt. In this case, the receipt information includes the accounting discount name information and the accounting discount amount information, the character string indicating the accounting discount name information and the character string indicating the accounting discount amount information are described as text in the print text data.

The customer number information item is an extraction item associated with information (hereinafter, referred to as "customer number information"), as an item value, indicating the number of customers who have made accounting.

The refund presence/absence information item is an extraction item associated with information), as an item value, indicating whether or not there was a refund in accounting. In accounting, a refund may be performed. In this case, information indicating that a refund has been made may be printed on the receipt. In this case, a character string representing information indicating that a refund has been made is described as text in the print text data.

The cancellation presence/absence information item is an extraction item associated with information, as an item value, indicating whether or not accounting has been canceled. Accounting may be canceled. In this case, information indicating that accounting has been canceled may be printed on the receipt. In this case, a character string representing information indicating that accounting has been canceled is described in the print text data.

A membership affiliation information item and a membership identification information item belong to the membership information item.

The membership affiliation information item is information (hereinafter referred to as "membership affiliation information"), as the item value, indicating a name of a service program to which the customer belongs. The membership identification information item is identification information (hereinafter referred to as "membership identification information"), as the item value, for identifying the customer in the service program to which the customer belongs. Detailed description of the membership information item will be omitted.

A payment method name information item and a payment amount information item belong to the payment method information item.

The payment method name information item is an extraction item associated with information (hereinafter referred to as "payment method name information"), as an item value, indicating a name of a payment method. The payment amount information item is information (hereinafter referred to as "payment amount information"), as an item value, indicating the amount of money paid by the customer in the payment method according to the payment method name information. Detailed description of the payment method information item will be omitted.

The issue date and time information item is an extraction item associated with issue date and time information J5 as an item value. The issue date and time information J5 is an item value obtained by combining the issue date and issue time, and is a value indicating the date on which the receipt is issued.

A commodity name information item, a purchase quantity information item, and a unit price information item belong to the commodity information item.

The commodity name information item is an extraction item associated with commodity name information J62 as an item value. The commodity name information J62 is a value indicating information on the commodity.

The purchase quantity information item is an extraction item associated with purchase quantity information J61 as an item value. The purchase quantity information J61 is a value indicating information on the commodity.

The unit price information item is an extraction item associated with unit price information J63 as an item value. The unit price information J63 is a value indicating information on the commodity.

The receipt identification information item is an extraction item associated with receipt identification information J42 as an item value.

Detailed description of the receipt identification information item will be omitted.

The sales method information item is an extraction item associated with information (hereinafter referred to as "sales method information"), as an item value, indicating how the sales of the commodity was performed. Detailed description of the sales method information item will be omitted.

The staff information item is information indicating a name of a staff in the shop or identification information for identifying the staff (hereinafter referred to as "staff information"), as the item value. The staff is a person in charge of accounting and a person who is in charge of providing a service to customers at a shop. Detailed description of the staff information item will be omitted.

The subtotal amount information item is an extraction item associated with subtotal amount information J72 as an item value. Detailed description of the subtotal amount information item will be omitted.

The tax information item is an extraction item associated with tax amount information J82 as an item value.

The total amount information item is an extraction item associated with total amount information J92 as an item value. The total amount information J92 is a value indicating the total amount.

There are cases in which some of the item values described above include information represented as a character string rather than information represented as a value (numerical value), but in the embodiment, it is treated as an item value.

As illustrated in the flowchart FC of FIG. 3, when analysis data is generated, the control server controller 40 registers the generated analysis data as one record in the analysis data management database 422 (Step SC5).

FIG. 7 is a diagram schematically illustrating information held by one record in the analysis data management database 422.

As illustrated in FIG. 7, one record in the analysis data management database 422 includes general identification information J13, serial number J11, shop identification information J12, issue date and time information J5, print data, print text data, and analysis data.

In Step SC5, the control server controller 40 registers a record, which is obtained by associating the general identification information J17, the serial number J11, the shop identification information J12, the issue date and time information J5 that are described in association with the corresponding item, and the received print data, and print text data with the analysis data, in the analysis data management database 422.

A plurality of Web application programming interfaces (APIs) are registered in the control server 15. Then, in response to a request from a browser of an external device, the control server 15 can perform processing with the registered Web API based on the analysis data management database 422 and can provide information required by the user. The term "user" here means, for example, an owner who operates a shop, a management company managing a shop or an employee of the management company of the shop, a person in charge of the shop, or the like. For example, in response to a request from a browser of an external device by a user, the control server controller 40 of the control server 15 provides total amount information J92 relating to a specific receipt using analysis data of the analysis data management database 422. With this, the user can utilize the total amount information J92.

As described above, the control server controller 40 of the control server 15 extracts the item value text from print text data by the function of each analysis program BP. The layout of the receipt may be different if the print device 12 is different. Accordingly, the analysis program BP analyzing the print text data transmitted by one print device 12 performs processing reflecting the layout of the one print device 12, and accurately extracts the item value text corresponding to the extraction item.

Based on the matters described above, the control server 15 according to the embodiment executes the following processing to thereby make it possible for the user to generate the analysis program BP having the function of accurately extracting the item value text by reflecting the layout of the print device 12 by performing a simple operation. In the following description, generation of an extraction condition and an analysis condition applied to the analysis program BP is also represented as generation of an analysis program BP.

Hereinafter, processing of the control server 15 will be described by taking a case where the fifteenth analysis program BP15 corresponding to the total amount information item, the eighth analysis program BP8 corresponding to the issue date and time information item, and the ninth analysis program BP9 corresponding to the commodity information item among the plurality of analysis programs BP are generated based on the user's operation.

In the following description, the control server 15 displays a user interface (screen) on a display panel included in the control server 15 according to the operation on the input means included in the control server 15. However, a configuration in which the user performs a predetermined operation on an external device capable of communicating with the control server 15, and the control server 15 displays the user interface on the external device in response to the request from the external device may be adopted.

The user operates input means of the control server 15 to activate processing (program) for generating the analysis program BP. The control server controller 40 controls the control server displayer 43 in accordance with a user's instruction to display a first user interface UI1 on the display panel.

Figure 8A:
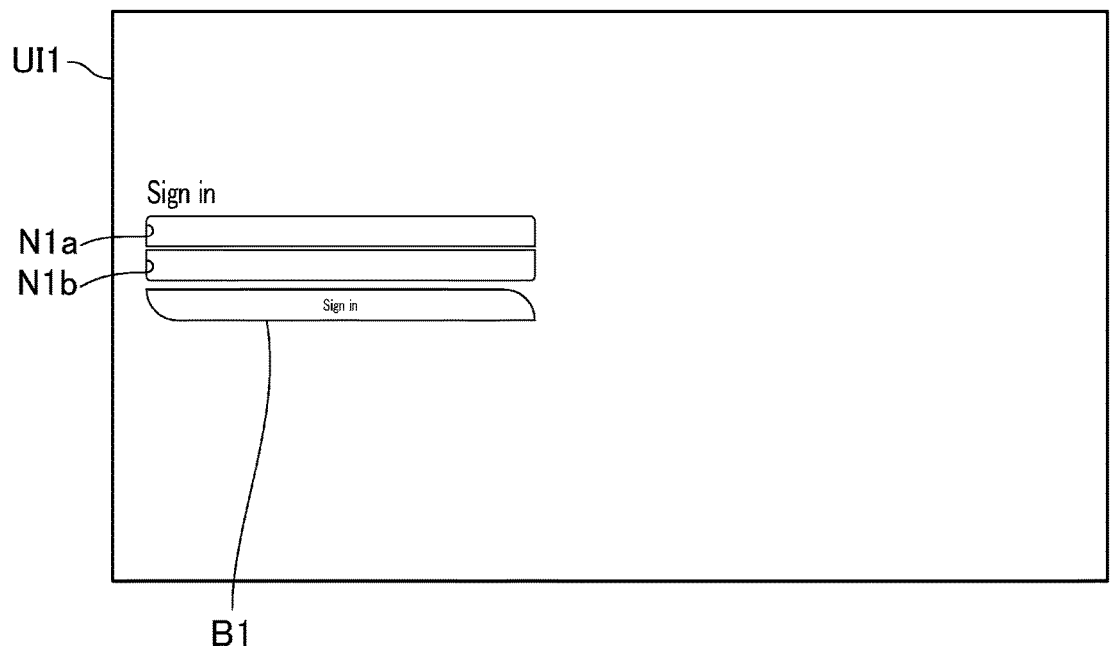
FIG. 8A is a view illustrating an example of a first user interface.

FIG. 8A is a view illustrating an example of the first user interface UI1.

As illustrated in FIG. 8A, the first user interface UI1 includes an input field N1a for inputting a user ID for identifying a user, an input field N1b for inputting a password for authenticating the user ID, and a button B1 for confirming the input to the input fields N1a and N1b.

The user inputs his/her user ID in the input field N1a, inputs the password corresponding to the user ID in the input field N1b, and operates the button B1 to confirm the input.

In a case where a combination of the input user ID and password matches the combination registered in advance, the control server controller 40 controls the control server displayer 43 to display a second user interface UI2 on the display panel.

Figure 8B:
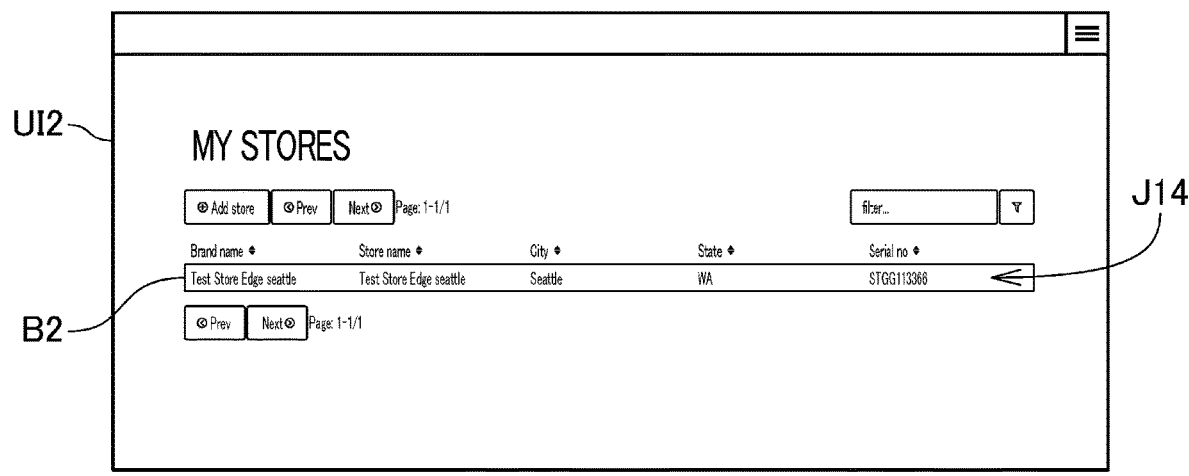
FIG. 8B is a view illustrating an example of a second user interface.

FIG. 8B is a view illustrating an example of the second user interface UI2.

As illustrated in FIG. 8B, the second user interface UI2 includes buttons B2 capable of selecting shops for the number of shops associated with to the user ID. One button B2 displays shop related information J14 (information including a brand name of the shop, a shop name, a location of the shop, the serial number J12 of the print device 12 installed in the shop and the like) relating to one shop There. In FIG. 8B, a case where the button B2 is one is exemplified, but the number of the buttons B2 of the second user interface UI2 differs depending on the user.

For example, in a case where the user indicated by the user ID is the owner of the shop, in the second user interface UI2, the button B2 displaying the shop related information J14 on shops operated by the owner is displayed by the number of operations (number of shops). In a case where the user indicated by the user ID is an installer who installs the print device 12 or the like in the shop or an employee of the installer, on the second user interface UI2, the button B2 displaying the shop related information J14 related to the shop that the installer or the employee of the installer is in charge is displayed by the number of shops that the installer or the employee of the installer is in charge.

When the one button B2 is selected in the second user interface UI2, the control server controller 40 displays a user interface for displaying a list of the print devices 12 installed in the shops indicated by the selected button B2 on the display panel. Then, in a case where one print device 12 is selected from among the print devices listed and displayed, the control server controller 40 controls the control server displayer 43 to display the third user interface UI3 on the display panel.

Figure 9A:
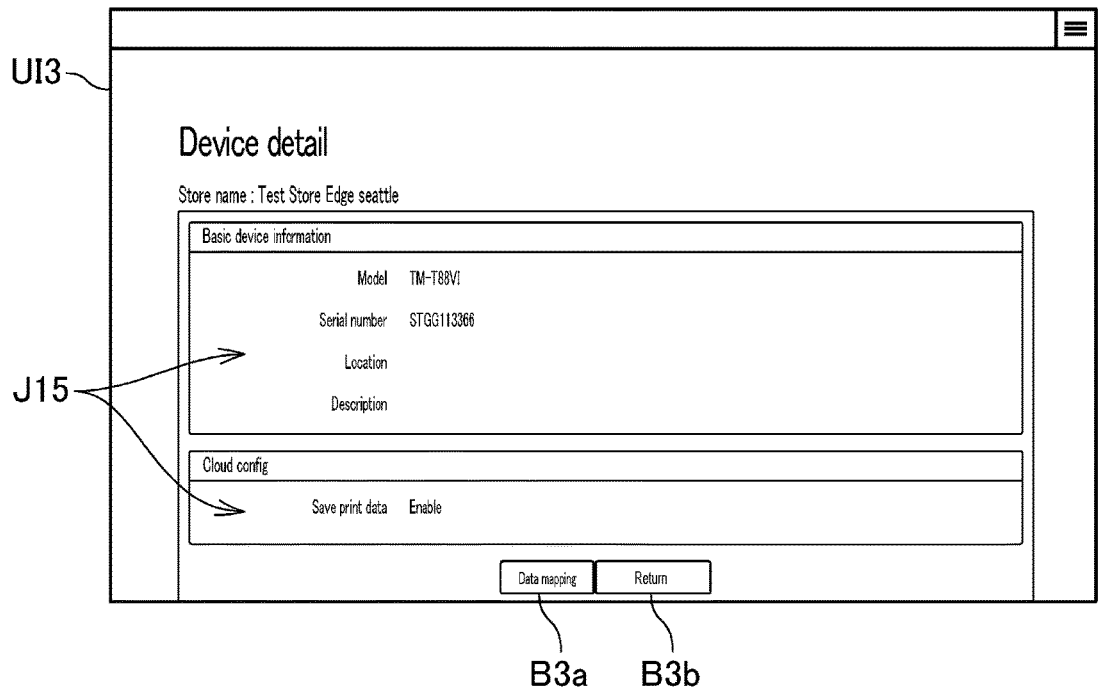
FIG. 9A is a view illustrating an example of a third user interface.

FIG. 9A is a view illustrating an example of the third user interface UI3.

As illustrated in FIG. 9A, the third user interface UI3 displays print device related information J15 (information including model number of the print device 12, serial number J11 of the print device 12, and the like) of the one print device 12 of the shop selected in the second user interface UI2. The third user interface UI3 includes a button B3a for making a transition to the user interface for generating the analysis program BP, and a button B3b for returning to the previous user interface.

In a case where the button B3a is selected in the third user interface UI3, the control server controller 40 controls the control server displayer 43 to display the fourth user interface UI4 on the display panel.

Figure 9B:
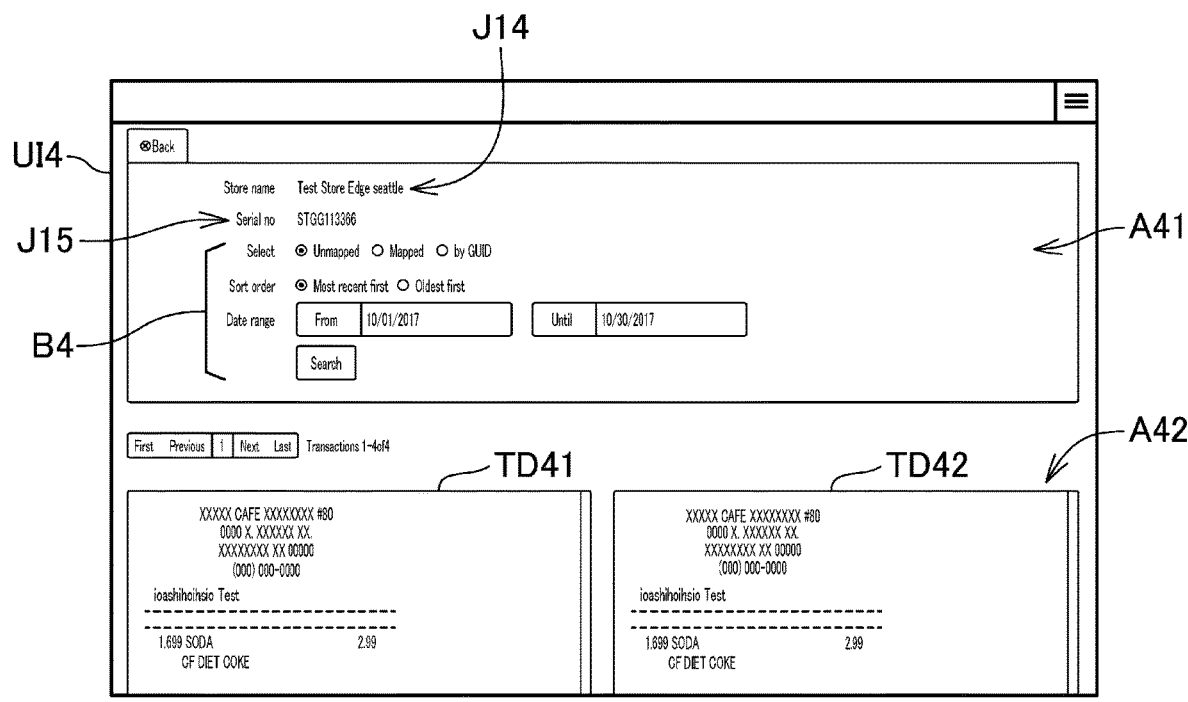
FIG. 9B is a view illustrating an example of a fourth user interface.

FIG. 9B is a view illustrating an example of the fourth user interface UI4.

As illustrated in FIG. 9B, the fourth user interface UI4 includes a display area A42 for displaying print text data and a retrieval area A41 for retrieving print text data to be displayed in the display area A42.

The retrieval area A41 includes shop related information J14 (shop name in FIG. 9B), print device related information J15 (serial number J11 in FIG. 9B), and a button group B4 in which a plurality of buttons for designating the print text data to be displayed in the display area A42 and for designating a display order are grouped. Examples of the buttons of the button group B4 include a button for displaying print text data of a receipt issued within a designated period and a button for rearranging the print text data in descending order of issue date and time, and the like.

The display area A42 displays one or a plurality of print text data matching the retrieval condition in the retrieval area A41 so as to be selectable. In FIG. 9B, print text data is displayed two by two. In FIG. 9B, although a part of the two print text data TD41 and TD42 is displayed, hidden print text data TD41 and TD 42 is displayed by performing an operation such as scrolling or page feed in the fourth user interface UI4.

When the print text data is displayed in the display area A42, the control server controller 40 acquires a record matching the serial number J11 of the print device 12 (print device 12 indicated by the fourth user interface UI4) designated in the second user interface U12 and the issue date and time information J5 within the period designated in the retrieval area A41 from the analysis data management database 422. Then, the control server controller 40 displays the print text data in the display area A42 based on the print text data included in the record acquired from the analysis data management database 422.

In a case where one print text data is selected in the display area A42 of the fourth user interface UI4, the control server controller 40 controls the control server displayer 43 to display the fifth user interface UI5 on the display panel.

FIG. 10 is a view illustrating an example of the fifth user interface UI5.

The fifth user interface UI5 is an initial screen in processing of generating the analysis program group BPG. More specifically, it is an initial screen in processing of generating an extraction condition and an analysis condition used by each analysis program BP. As illustrated in FIG. 10, the fifth user interface UI5 includes an item selection area A51 and a text display area A52.

In the text display area A52, a text display screen G52 is displayed. The text display screen G52 is a screen on which text described in the print text data is displayed.

Print text data displayed on the text display screen G52 is the print text data selected in the display area A42 of the fourth user interface UI4. As described above, the print text data is text data in which receipt information printed as characters in the receipt are described in a state where the order of printing and line feed in printing are reflected. That is, on the text display screen G52, the receipt information is displayed in accordance with the layout of the receipt. By referring to the text display screen G52, the user can easily and intuitively ascertain the contents of the receipt information described in the print text data and the layout of the corresponding receipt.

The control server controller 40 receives selection of extraction item related text (first text) on the text display screen G52. The extraction item related text is text related to extraction of item value text for the extraction item, and some or all of pieces of text constituting the print text data displayed on the text display screen G52 may correspond to the extraction item related text. The extraction item related text also includes text related to extraction of item name text to be described later.

The selection of the extraction item related text indicates that the character or character string displayed as text on the text display screen G52 is selected as the extraction item related text. For example, the extraction item related text is selected by the user's mouse operation. In the embodiment, there are a "space character", a "special character", and "ordinary characters" as types of characters. The space character is a character forming a space. The special character is a predetermined symbol among the symbols. The special character is a symbol that may be used for information having special meanings such as area division information. For example, the special character includes a character "-", a character "~", a character "=", a character ":", and the like. The ordinary characters are characters excluding the space character and the special character among characters, and are mainly alphanumeric characters.

In item selection area A51, item selection screen G51 is displayed.

In the item selection screen G51, for each of the fifteen extraction items described above, name information indicating names of extraction items are listed and displayed in a selectable manner.

That is, in the item selection screen G51, "Printed at" indicating name information of the issue date and time information item, "Products" indicating name information of the commodity information item, "Receipt ID" indicating name information of the receipt identification information item, "Total" indicating name information of the total amount information item, "Consumer ID" indicating name information of the customer identification information item, "Discounts" indicating name information of the accounting discount information item, "Guests" indicating name information of the customer number information item, "Is Refund" indicating name information of a refund presence/absence information item, "Is Void" indicating name information of the cancellation presence/absence information item, "Memberships" indicating name information of the membership information item, "Payment methods" indicating name information of the payment method information item, "Sales type" indicating name information of the sales method information item, "Staff" indicating name information of the staff information item, "Subtotal" indicating name information of the subtotal amount information item, and "Taxes" indicating name information of the tax information item are selectably listed and displayed.

In the item selection screen G51, among the extraction items on which name information is displayed, a mark M5a (for example, an asterisk) indicating that it is an essential item is displayed in associated with name information, for items for which acquisition of item values is essential in analysis processing. In the example of FIG. 10, the mark M5a is displayed in association with the name information of "Printed at", "Products", "Receipt ID", and "Total". With this, by referring to the item selection screen G51, the user can easily and intuitively recognize the essential items in analysis processing.

When transition is made from the fourth user interface UI4 to the fifth user interface UI5, the control server controller 40 executes analysis processing based on a default analysis program group BPG on the print text data selected using the fourth user interface UI4. Then, the control server controller 40 displays a processing result of the analysis processing on the item selection screen G51 when displaying the fifth user interface UI5. The default analysis program group BPG is an analysis program group BPG including the analysis program BP previously generated as will be described later or an analysis program group BPG provided in advance.

As illustrated in FIG. 10, on the item selection screen G51, a mark M5b (for example, a check mark) indicating that acquisition of the item value has been completed for the extraction items for which item values have been acquired is displayed in association with name information. In the example of FIG. 10, the mark M5b is displayed in association with name information other than "Consumer ID", "Discounts", "Memberships", and "Subtotal". The mark M5b is not displayed for the extraction item for which acquisition of the item value has not been completed. The extraction item for which acquisition of item values has not been completed is an extraction item in which information (for example, a null value) indicating that the item value text cannot be extracted is described in analysis data generated by the analysis program group BPG. Accordingly, the extraction item for which acquisition of the item value has not been completed corresponds to an extraction item of which item value text cannot be extracted. As such, by displaying the mark M5b, the user refers to the item selection screen G51 so as to make it possible to easily and intuitively recognize the extraction item for which acquisition (item value text extraction) the item value could not be made.

In the item selection screen G51, item value related information is displayed corresponding to name information. The item value related information includes the acquired item value, information indicating that there are a plurality of item values, and information indicating that the item value cannot be acquired.

For example, on the item selection screen G51, an item value "2017-10-05T14:24:34.000" is displayed in association with name information "Print at", an item value "Server" is displayed in association with name information "Receipt ID", an item value "35.36" is displayed in association with name information "Total", an item value "2" is displayed in association with name information "Guests", and an item value "IN" is displayed in association with name information "Sales type".

For example, on the item selection screen G51, information "Select to see mapping details" indicating that there are a plurality of item values is displayed in association with each of pieces of name information "Products", "Payment methods", "Staff", and "Taxes". In a case where this information is selected, the control server controller 40 displays the acquired item value for a plurality of extraction items (for example, in the case of commodity information items, commodity name information item, purchase quantity information item, and unit price information item) belonging to the extraction item indicated by the name information.

For example, on the item selection screen G51, information "Not found" indicating that the item value cannot be acquired is displayed. "Not found" is displayed in the item not marked with the mark M5b, which indicates that the item value can be acquired, in association with the name information.

In FIG. 10, since the results of analysis by the default analysis program group BPG are illustrated, some of these item values may include items (that is, erroneous item values) that are not item values desired by the user. As will be described later, as the user generates the analysis program group BPG, each item value related information displayed on the item selection screen G51 changes according to the analysis result by the generated analysis program group BPG.

As such, by displaying the item value related information corresponding to the name information on the item selection screen G51, the user can easily and intuitively recognize what kind of situation an acquisition situation of the item value is for each extraction item.

Figure 11:
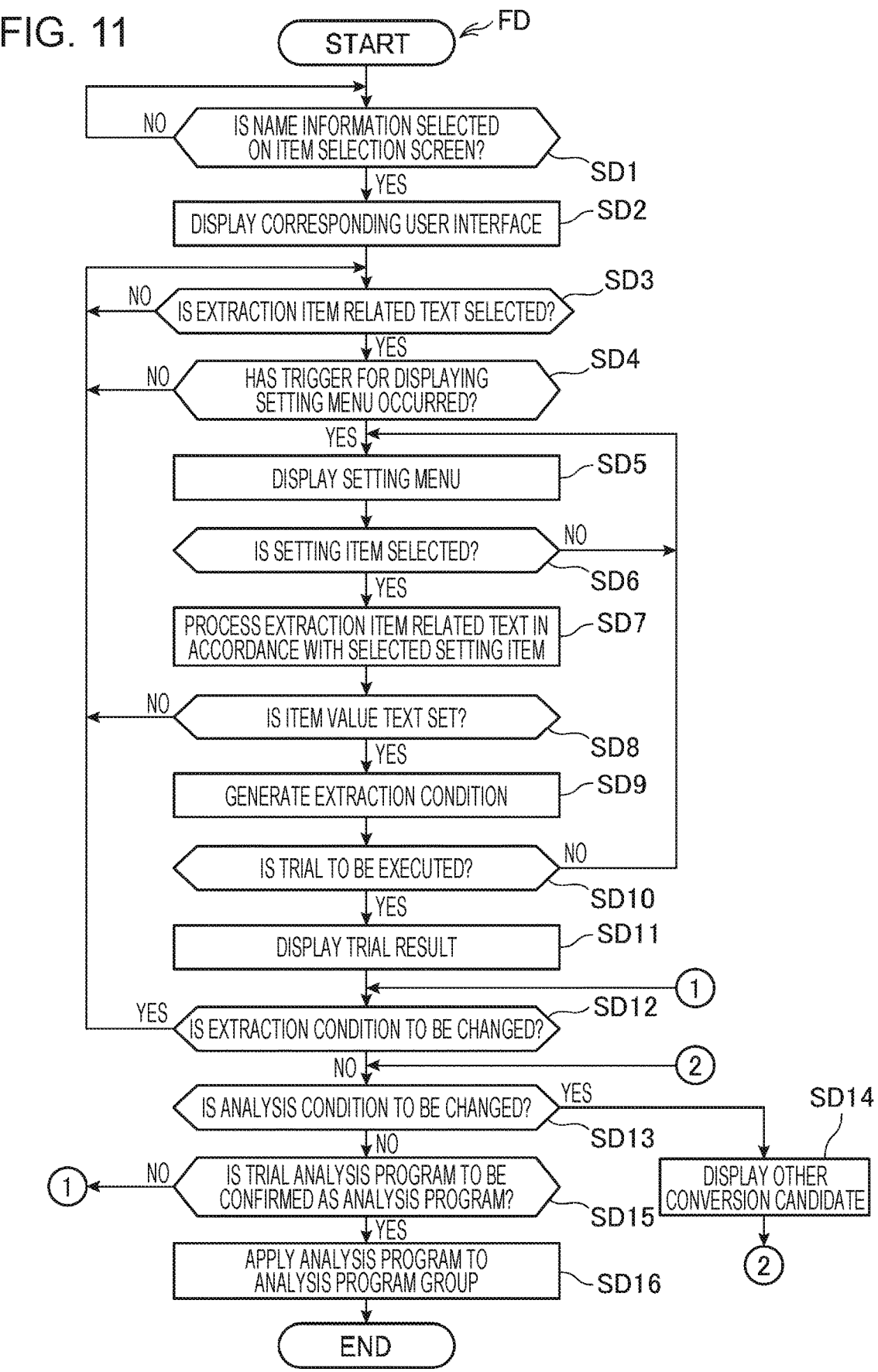
FIG. 11 is a flowchart illustrating an operation of the control server.

FIG. 11 is a flowchart illustrating an operation of the control server 15.

FIG. 11 illustrates the operation of the control server 15 that generates the analysis program group BPG starting from the operation of the user with respect to the fifth user interface UI5.

Generation of Fifteenth Analysis Program

A case where the fifteenth analysis program BP corresponding to the total amount information item is generated will be described. As illustrated in the flowchart FD of FIG. 11, the control server controller 40 determines whether or not name information is selected on the item selection screen G51 of the fifth user interface UI5 (Step SD1).

In a case where name information is selected on the item selection screen G51, the control server controller 40 displays a user interface corresponding to the extraction item indicated by the selected name information (Step SD2).

For example, in a case where the name information of "Total" is selected (for example, clicked with a mouse) on the item selection screen G51, the control server controller 40 displays the sixth user interface UI6 corresponding to the total amount information item.

Figure 12:
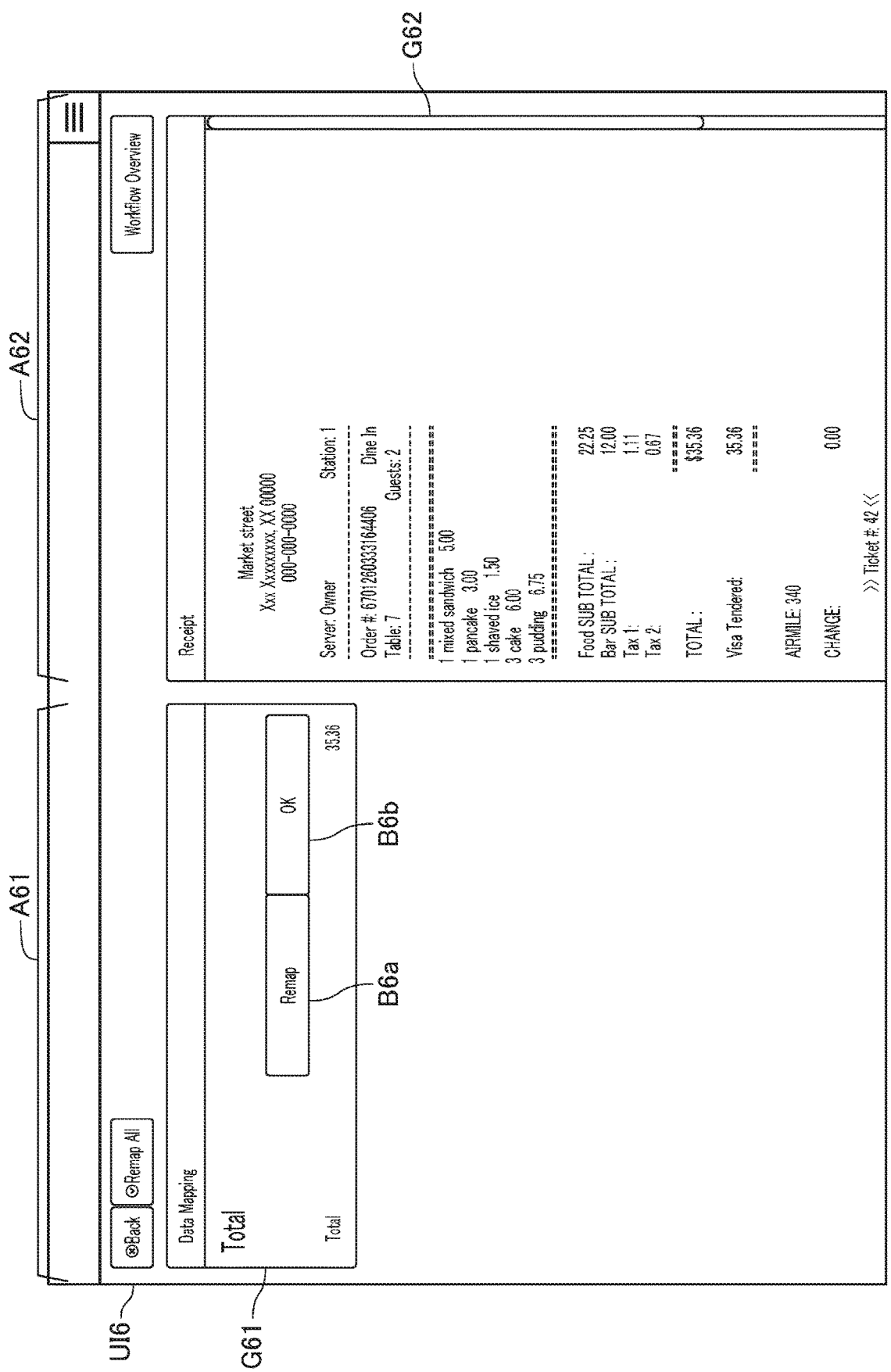
FIG. 12 is a view illustrating an example of a sixth user interface.

FIG. 12 is a view illustrating an example of the sixth user interface UI6.

As illustrated in FIG. 12, the sixth user interface UI6 includes a selection area A61 and a text display area A62.

In the text display area A62, a text display screen G62 is displayed. Similar to the text display screen G52, the text display screen G62 is a screen on which text described in the print text data is displayed. In a case where transition is made from the fifth user interface UI5 illustrated in FIG. 10 to the sixth user interface UI6 illustrated in FIG. 12, the print text data displayed on the text display screen G62 is the same print text data as the text display screen G52.

A part of the print text data is displayed on the text display screen G62 of FIG. 12, but a part of hidden print text data is displayed according to an operation such as scrolling.

A selection screen G61 is displayed in the selection area A61.

The selection screen G61 includes buttons B6a and B6b. The button B6a is a button for starting processing of generating the fifteenth analysis program BP15, and a character string of "Remap" is displayed in the button B6a. The button B6b is a button for terminating generation processing of the fifteenth analysis program BP15, and a character string "OK" is displayed in the button B6b.

In the selection screen G61, the analysis result (extraction result) by the current fifteenth analysis program BP15 (default fifteenth analysis program BP15 in the embodiment) is displayed below the buttons B6a and B6b. In the example illustrated in FIG. 12, name information of the extraction item indicating "Total" and an item value indicating "35.36" are displayed. As such, by displaying the name information and the item value of the extraction item on the selection screen G61, the user can easily determine whether or not generation (including change) of the fifteenth analysis program BP15 is needed.

When the button B6b is selected in the sixth user interface UI6, the control server controller 40 makes a transition from the sixth user interface UI6 to the fifth user interface UI5. On the other hand, in a case where the button B6a is selected in the sixth user interface UI6, the control server controller 40 controls the control server displayer 43 to display the seventh user interface UI7 on the display panel.

Figure 13:
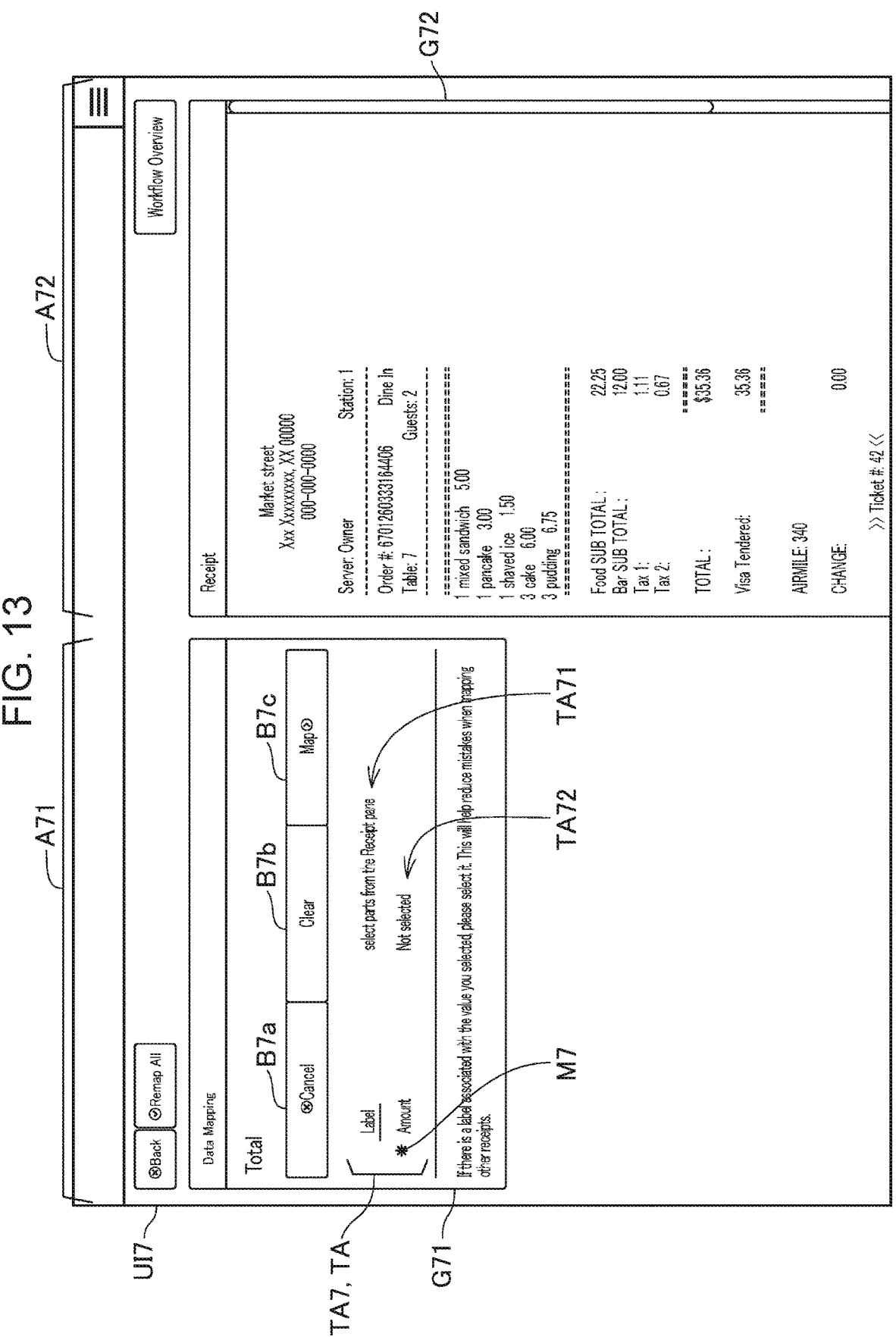
FIG. 13 is a view illustrating an example of a seventh user interface.

FIG. 13 is a view illustrating an example of the seventh user interface UI7.

As illustrated in FIG. 13, the seventh user interface UI7 includes a setting area A71 and a text display area A72.

In the text display area A72, a text display screen G72 is displayed. The text display screen G72 is the same screen as the text display screen G62.

In the setting area A71, a setting screen G71 is displayed. The setting screen G71 includes a button B7a, a button B7b, a button B7c, and a text setting area TA7.

The button B7a is a button for closing display of the seventh user interface UI7. In a case where the button B7a is selected in the seventh user interface UI7, the control server controller 40 controls the control server displayer 43 to close display of the seventh user interface UI7 and display the sixth user interface UI6.

The button B7b is a button for clearing the contents which are set in the text setting area TA7.

The button B7c is a button for instructing trial (execution) of analysis processing on the print text data displayed on the text display screen G72 based on the contents which are set in the text setting area TA7. A user interface after selection of the button B7c will be described later.

The text setting area TA7 (TA) includes an item name text area TA71 and an item value text area TA72.

In the item name text area TA71, item name text (third text) selected (set) by the user from print text data displayed on the text display screen G72 is displayed. The item name text indicates text functioning as a search keyword when extracting item value text (second text) from the print text data. In FIG. 13, the state before the item name text is set is illustrated. For that reason, in FIG. 13, information ("select parts from the Receipt pane") instructing setting of the item name text is displayed.

In the item value text area TA72, the item value text (first text) selected (set) by the user from the print text data displayed on the text display screen G72 is displayed. In FIG. 13, the state before the item value text is set is illustrated. For that reason, in FIG. 13, information ("not selected") indicating that the item value text is not set is displayed.

In FIG. 13, since a state in which the item name text area TA71 is selected is illustrated, information for instructing setting of the item name text is displayed in the item name text area TA71, but in the state where the item value text area TA72 is selected, information for instructing setting of the item value text is displayed in the item value text area TA72 and information indicating that the item name text is not set in the item name text area TA71 is displayed.

In the text setting area TA7, a mark M7 (for example, an asterisk) indicating that it is an essential item is displayed for items for which setting is essential at the time of generation of the fifteenth analysis program BP15. In the example of FIG. 13, the mark M7 is displayed in the item value text area TA72. With this, the user can easily and intuitively recognize items for which setting is essential at the time of generation of the fifteenth analysis program BP15.

When returning to the description of the flowchart FD in FIG. 11, if the corresponding user interface (UI6 or UI7) is displayed in Step SD2, the control server controller 40 determines whether or not the extraction item related text (first text or third text) is selected in the user interface UI7 (Step SD3).

In a case where when it is determined that the extraction item related text is selected (YES in Step SD3), the control server controller 40 determines whether or not a trigger for displaying a setting menu has occurred (Step SD4). As this trigger, a predetermined operation (for example, right click of the mouse) by the user may be included. In a case where it is determined that the trigger for displaying the setting menu has occurred, the control server controller 40 controls the control server displayer 43 to display the setting menu (Step SD5). Here, the setting menu is a menu for setting the selected extraction item related text as the item value text or item name text.

Figure 14A:
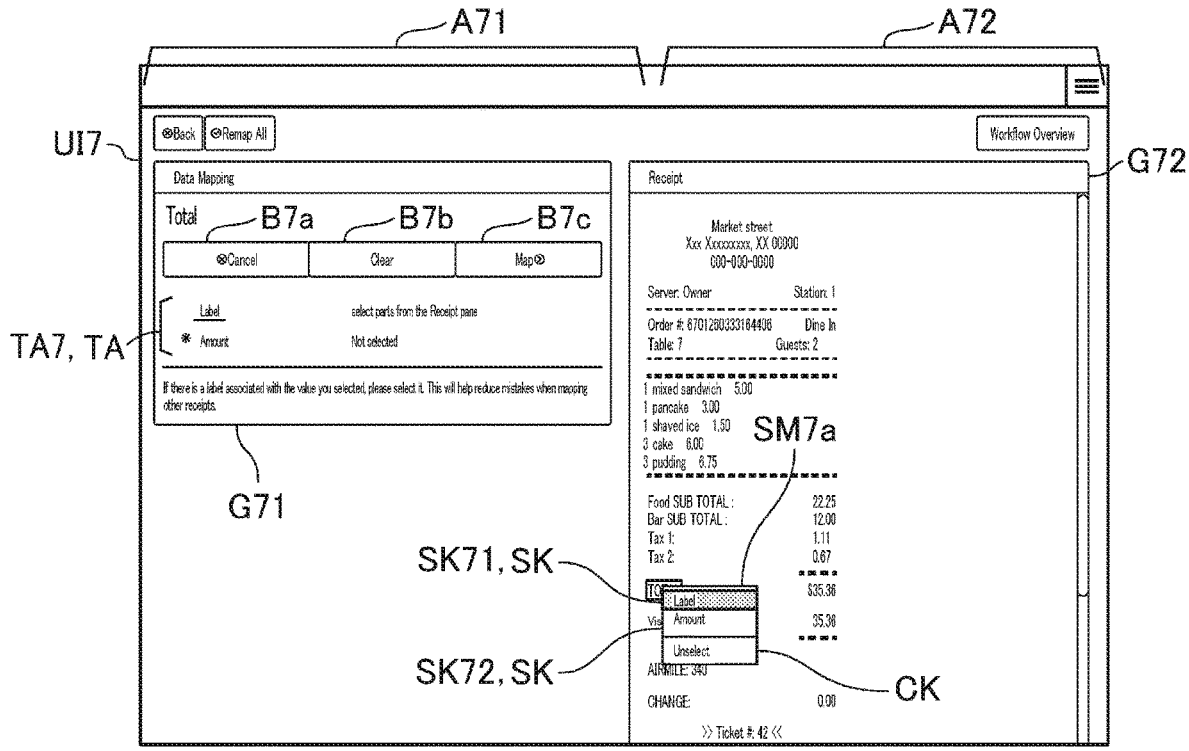
FIG. 14A is another view illustrating the example of the seventh user interface.

FIG. 14A is a view illustrating an example of the seventh user interface UI7 on which a setting menu is displayed.

In the seventh user interface UI7 of FIG. 14A, a state where the extraction item related text indicating "Total" in the print text data displayed on the text display screen G72 is selected is illustrated. The selected extraction item related text (character string "TOTAL") is displayed so as to be identifiable from another extraction item related text, for example, by highlight display.

For example, when the right click operation of the mouse is performed by the user in a state where the extraction item related text is selected, a setting menu SM7a is displayed. The position where the setting menu SM7a is displayed may be anywhere as long as it is on the seventh user interface UI7, the position is preferably located in the text display screen G72, and more preferably near the selected extraction item related text.

As illustrated in FIG. 14A, the setting menu SM7a includes as a plurality of selectable setting items SK. That is, the setting menu SM7a includes an item name setting item (item name) SK71 ("Label") for setting the selected extraction item related text as item name text and an item value setting item (item value) SK72 ("Amount") for setting the selected extraction item related text as item value text.

The type of the setting item SK included in the setting menu SM7a differs according to the extraction item.

The setting menu SM7a includes a cancellation item CK ("Unselect") to be selectable other than the setting item SK described above. The cancellation item CK is an item to close display of the setting menu SM7a by being selected.

When returning to the description of the flowchart FD in FIG. 11, if the setting menu is displayed, the control server controller 40 determines whether or not the setting item SK included in the setting menu is selected (Step SD6). In a case where it is determined that the setting item SK is selected (YES in Step SD6), the control server controller 40 processes the extraction item related text in accordance with the selected setting item SK (Step SD7). That is, the control server controller 40 sets the selected extraction item related text as an item name text or item value text in accordance with the selected setting item SK, and displays the selected extraction item related text in the text setting area TA7. Alternatively, in a case where the cancellation item CK is selected, display of the setting menu SM7a is closed.

Figure 14B:
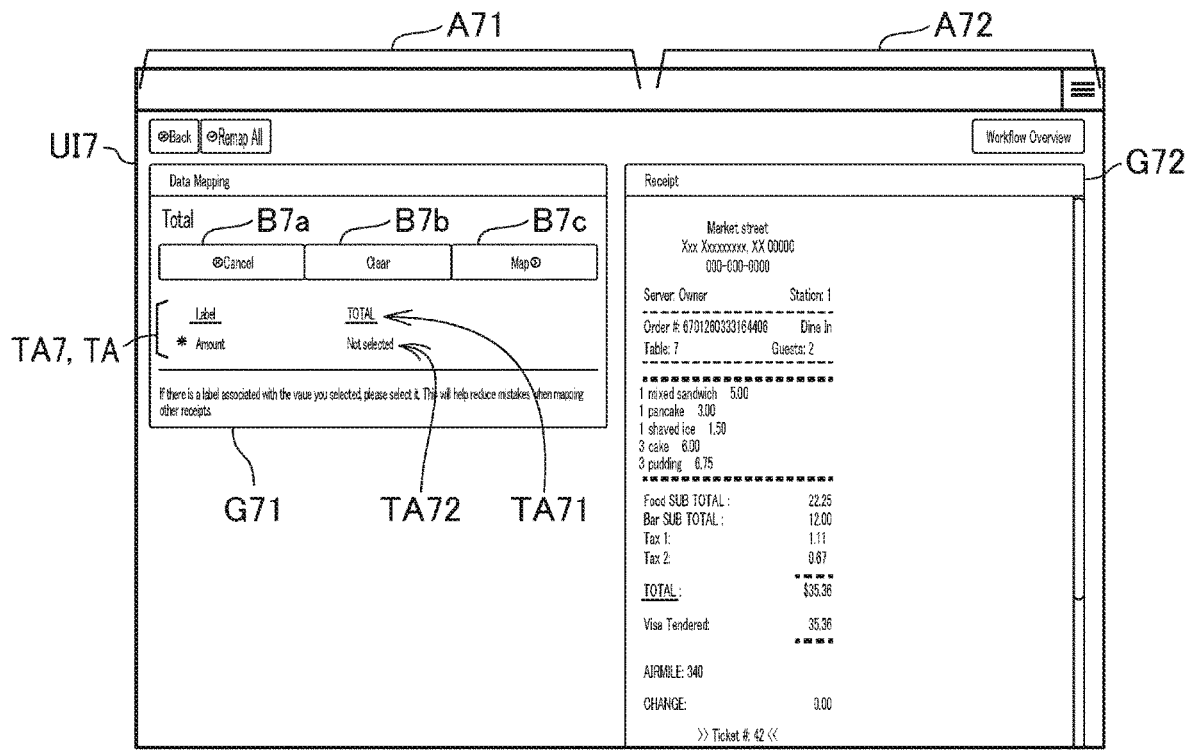
FIG. 14B is still another view illustrating the example of the seventh user interface.

FIG. 14B is a view illustrating an example of the seventh user interface UI7 in the case where the setting item SK is selected in the setting menu SM7a displayed in FIG. 14A and processing of Step SD7 is performed. In FIG. 14B, the seventh user interface UI7 in a case where the item name setting item SK71 is selected is illustrated.

As is apparent from a comparison between FIG. 14B and FIG. 14A, when the item name setting item SK71 is selected, the control server controller 40 closes display of the setting menu SM7a and displays the selected extraction item related text (character string "TOTAL") as item name text in the item name text area TA71.

As such, the user selects the extraction item related text in the print text data displayed on the text display screen G72, displays the setting menu SM7a, and selects the item name setting item SK71 to thereby make it possible to set the selected extraction item related text as item name text.

Further, by selecting the item value setting item SK72, the user can set the extraction item related text as the item value text.

Figure 15A:
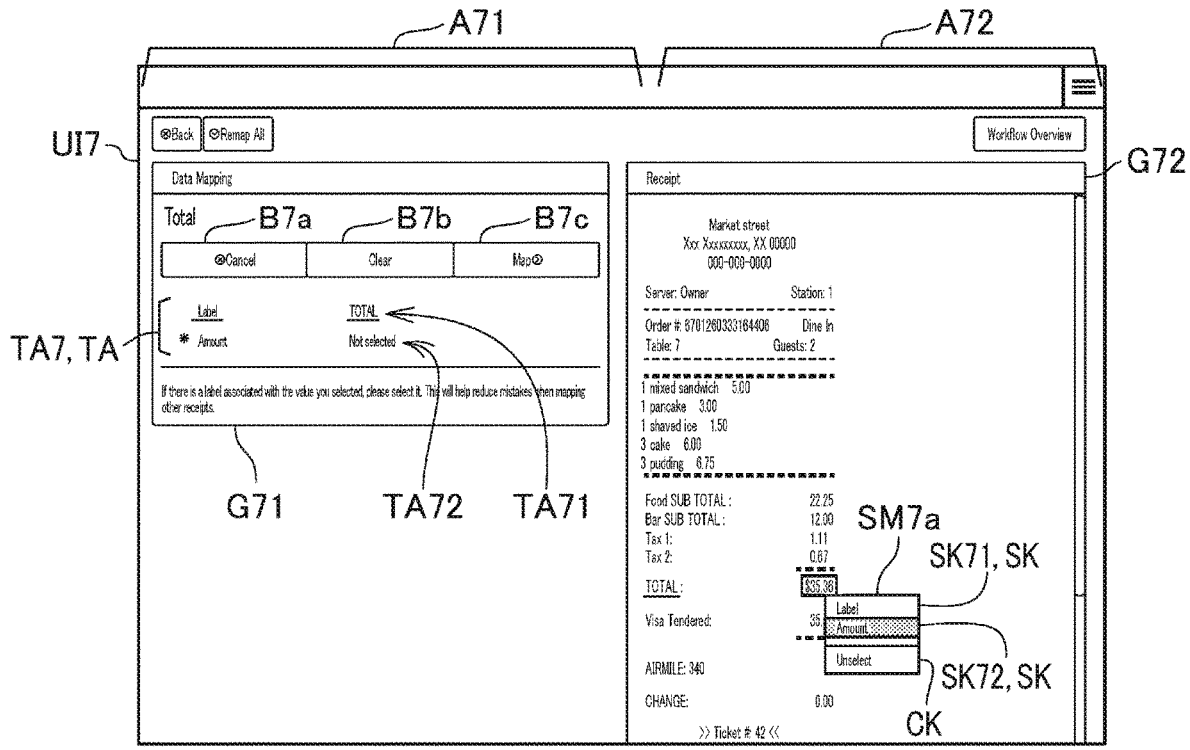
FIG. 15A is still another view illustrating the example of the seventh user interface.

FIG. 15A is a view illustrating an example of the seventh user interface UI7 on which the setting menu SM7a is displayed. In FIG. 15A, the seventh user interface UI7 in the case where the item value text is set after setting the item name text is illustrated. For that reason, in the item name text area TA71, the character string "TOTAL" which is item name text is displayed.

In the seventh user interface UI7 of FIG. 15A, "$35.36" is selected as extraction item related text in the print text data displayed on the text display screen G72.

As illustrated in FIG. 15A, when the user performs a right click operation of the mouse in the state where extraction item related text is selected, the setting menu SM7a is displayed.

Figure 15B:
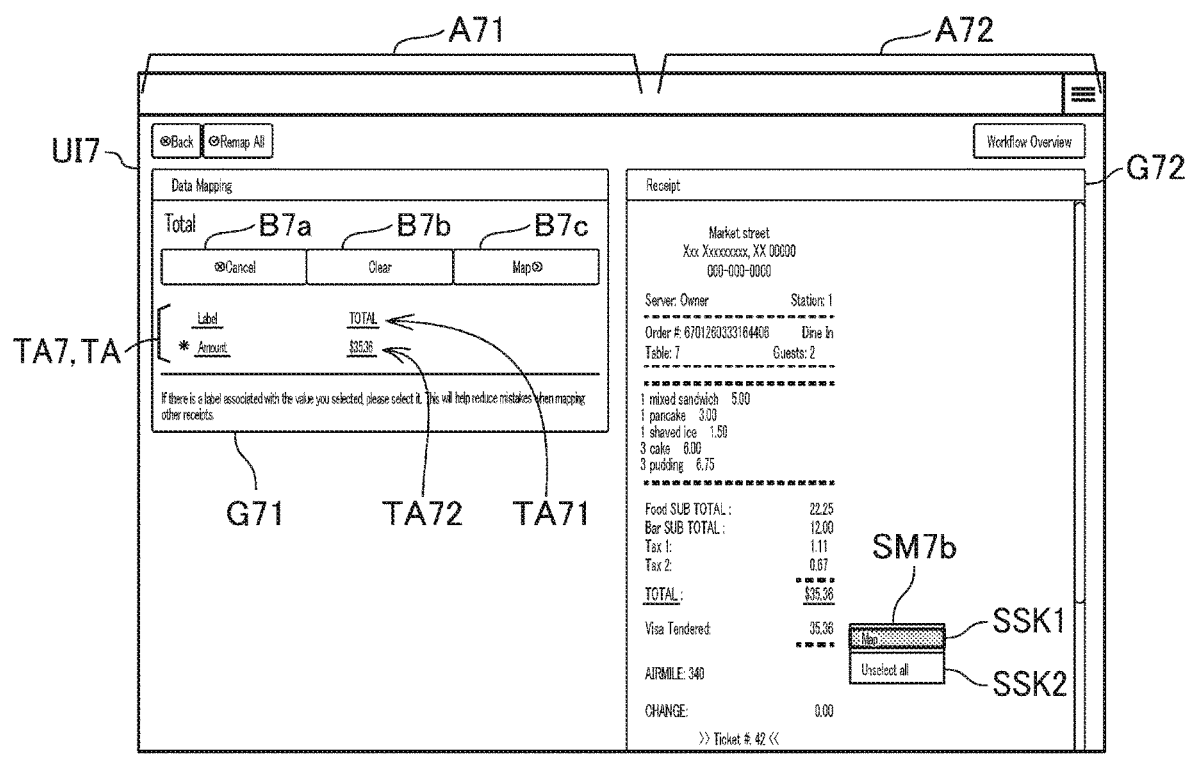
FIG. 15B is still another view illustrating the example of the seventh user interface.

FIG. 15B is a view illustrating an example of the seventh user interface UI7 in the case where the setting item SK is selected in the setting menu SM7a displayed in FIG. 15A and processing of Step SD7 is performed. In FIG. 15B, the seventh user interface UI7 in the case where the item value setting item SK72 is selected is illustrated.

As is apparent from a comparison between FIG. 15B and FIG. 15A, when the item value setting item SK72 is selected, the control server controller 40 closes display of the setting menu SM7a and displays the selected extraction item related text (character string "$35.36") as item value text in the item value text area TA72.

In the seventh user interface UI7, a trial menu SM7b is displayed as illustrated in FIG. 15B. For example, the trial menu SM7b is displayed as the user right-clicks the mouse in an area where print text data is not present on the text display screen G72. The trial menu SM7b includes a trial execution item SSK1 and a setting cancellation item SSK2 to be selectable. The trial execution item SSK1 is an item for instructing a trial (execution) of analysis processing on the print text data. The setting cancellation item SSK2 is an item for canceling setting of the item name text and the item value text. The trial menu SM7b may be displayed effectively (selectably) in a case where the item value text (or item name text) for the essential item is set.

When returning to the description of the flowchart FD in FIG. 11, the control server controller 40 determines whether or not the item value text is set (Step SD8). That is, the control server controller 40 determines whether or not the item value text is set for the essential setting item. For example, in a case where the item value text is not set as in the seventh user interface UI7 illustrated in FIG. 14B (NO in Step SD8), the control server controller 40 returns processing to Step SD5. Further, for example, in a case where the item value text is set as in the seventh user interface UI7 illustrated in FIG. 15B (YES in Step SD8), the control server controller 40 cause processing to proceed to Step SD9.

In Step SD9, the control server controller 40 generates an extraction condition based on setting of item value text which is an essential setting item and item name text which is an optional setting item (Step SD9). For example, when settings illustrated in FIG. 15B, that is, the item name text and the item value text are set, the control server controller 40 generates the following extraction condition.

Extraction condition: The text (second text) to be extracted from the print text data as the item value text is text which is in the same line as text indicating the character string of "TOTAL", and positioned after the text indicating the character string of "TOTAL" (right side in FIG. 15B), and indicates a character string (including one character) excluding space characters.

The text (second text) matching this extraction condition is text of the character string "$35.36" in the print text data displayed by the seventh user interface UI7.

As such, the control server controller 40 sets the position of the item value text with respect to the position of the item name text which is set in the text setting area TA7 as a relative position of the item value text in the print text data, and generates an extraction condition based on the relative position. With this, in a case where the print text data which becomes a target of analysis processing is the layout (layout of the print text data displayed on the text display screen G72 of the seventh user interface UI7) referred to at the time of generating the extraction condition, the control server controller 40 can accurately extract the item value text (second text) from the print text data. That is, the control server controller 40 can accurately extract the item value text indicating total amount information J92 from the print text data.

When the extraction condition is generated, the control server controller 40 determines whether or not to execute a trial of analysis processing on the print text data displayed on the text display screen G72 (Step SD10). The trial of analysis processing indicates analysis processing of print text data by a trial analysis program. The trial analysis program is an analysis program BP for extracting text matching with the extraction condition generated in Step SD9 as an item value text, and here, the analysis program BP is an analysis program BP which is a candidate for the fifteenth analysis program BP15.

For example, in the seventh user interface UI7 illustrated in FIG. 15B, in a case where the button B7c in which the character string "Map" is displayed is selected, the control server controller 40 determines to execute a trial of analysis processing (YES in Step SD10). Further, for example, in the seventh user interface UI7 illustrated in FIG. 15B, in a case where the trial execution item SSK1 is selected from the trial menu SM7b, the control server controller 40 determines to execute a trial of analysis processing (YES in Step SD10).

When the control server controller 40 determines to execute a trial of analysis processing (YES in Step SD10), the control server controller 40 executes the trial of the analysis processing and displays the trial result (Step SD11).

FIG. 16 is a view illustrating an example of the eighth user interface UI8.

As illustrated in FIG. 16, the eighth user interface UI8 includes a result area A81 and a text display area A82.

In the text display area A82, a text display screen G82 is displayed. The text display screen G82 is the same screen as the text display screens G62 and G72. Further, on the text display screen G82, the item name text used as a search keyword and the extracted item value text is displayed in a mode (for example, highlight) different from other texts, in the trial of analysis processing.

In the result area A81, a result screen G81 is displayed. The result screen G81 includes a button B8a, a button B8b, a button B8c, and a trial result area TA8.

The button B8a is a button for closing display of the eighth user interface UI8. In a case where the button B8a is selected in the eighth user interface UI8, the control server controller 40 controls the control server displayer 43 to close display of the eighth user interface UI8 and display the sixth user interface UI6 or the fifth user interface UI5.

The button B8b is a button for executing resetting in the text setting area TA7 of the seventh user interface UI7. In a case where the button B8b is selected in the eighth user interface UI8, the control server controller 40 controls the control server displayer 43 to close display of the eighth user interface UI8 and display the seventh user interface UI7 in a state where nothing is set in the text setting area TA7.

The button B8c is a button for confirming the trial analysis program as the fifteenth analysis program BP15. In a case where the button B8c is selected in the eighth user interface UI8, the control server controller 40 confirms the trial analysis program having the generated extraction condition as the fifteenth analysis program BP15. Then, the control server controller 40 controls the control server displayer 43 to close display of the eighth user interface UI8 and display the fifth user interface UI5. At this time, the control server controller 40 displays the item value acquired by the fifteenth analysis program BP15 to which the newly generated extraction condition is applied, as the item value of the total amount information item (name information "Total"), on the item selection screen G51 of the fifth user interface UI5.

In the trial result area TA8 of the eighth user interface UI8, trial result information indicating the trial result is displayed. In FIG. 16, the character string "35.36" is displayed as trial result information.

When trial result information is displayed, the control server controller 40 converts item value text (second text) matching the extraction condition into a format desired by the user, acquires the converted item value text as the item value, and displays the converted item value text. In the case of FIG. 16, the control server controller 40 converts the item value text indicating "$35.36" into a format in which "$" is removed and acquires "35.36" as the item value and displays "35.36". Accordingly, the analysis condition for converting "$35.36" into "35.36" is defined in the trial analysis program.

The analysis condition here is, for example, the following condition.

Analysis condition: Converts item value text to a format in which the first character "$" of the extracted item value text is removed.

Under this analysis condition, the item value text (second text) extracted in accordance with the extraction condition described above is converted into a format in which "$" is removed.

When the trial result is displayed, the control server controller 40 determines whether or not to change the extraction condition (Step SD12). For example, in a case where the button B8*b* is selected in the eighth user interface UI8, the control server controller 40 determines to change the extraction condition (YES in Step SD12).

In a case where it is determined to change the extraction condition (YES in Step SD12), the control server controller 40 controls the control server displayer 43 to make transition from the eighth user interface UI8 to the seventh user interface UI7 and returns processing to Step SD3. On the other hand, in a case where it is determined that the extraction condition is not changed (NO in Step SD12), the control server controller 40 causes the processing to proceed to Step SD13.

The control server controller 40 determines whether or not to change the analysis condition in Step SD13 (Step SD13). For example, in a case where there are a plurality of conversion candidates for converting the format of the extracted item value text and a button B10*d* is selected in the tenth user interface UI10 (see FIG. 17B) to be described later, the control server controller 40 determines to change the analysis condition (YES in Step SD13). In a case where the analysis program BP (for example, fifteenth analysis program BP15 or the like) is generated for the extraction item having no conversion candidates, the control server controller 40 may skip processing of Step SD13. In a case where the control server controller 40 determines to change the analysis condition (YES in Step SD13), the control server controller 40 displays another conversion candidate (Step SD14) and returns processing to Step SD13. Step S13 and Step SD14 will be described later in detail.

In a case where it is determined that the analysis condition is not changed (NO in Step SD13), the control server controller 40 determines whether or not to confirm the trial analysis program as the analysis program BP (Step SD15). For example, in a case where the button B8*c* is selected in the eighth user interface UI8 illustrated in FIG. 16, the control server controller 40 determines to confirm the trial analysis program as the fifteenth analysis program BP15 (YES in Step SD15).

In a case where it is determined that the analysis program BP is confirmed (YES in Step SD15), the control server controller 40 applies to the confirmed analysis program BP to the analysis program group BPG (Step SD16). An analysis program group BPG which becomes an application target is the analysis program group BPG associated with the serial number J11 of the print device 12 designated by using the third user interface UI3 illustrated in FIG. 9A.

As such, the control server controller 40 receives selection of the extraction item related text and displays the item name setting item SK71 and the item value setting item SK72 as the setting menu SM7*a* in a state where the extraction item related text is selected. Then, in a case where the item value setting item SK72 is selected, the control server controller 40 sets the selected extraction item related text as item value text, and in a case where the item name setting item SK71 is selected, the control server controller 40 selects the set extraction item related text as item name text. Then, the control server controller 40 generates the extraction condition based on the relative position of the item value text (position of the item value text with respect to the item name text in the embodiment described above for generating the fifteenth analysis program). With this, the user can generate the extraction condition (analysis program BP) by a simple operation of selecting text to be extracted from the print text data and setting the item value text and the item name text. The control server controller 40 can accurately extract the item value text indicating total amount information J92 from the print text data by the generated fifteenth analysis program BP15.

In the description as above, the case of generating the fifteenth analysis program BP15 is exemplified, and generation of the analysis program BP is described. Even for the other analysis program BP, the user can generate the analysis program BP by a simple operation similar to the fifteenth analysis program BP15.

Generation of Eighth Analysis Program

A case of generating the eighth analysis program BP8 will be described. Similar to the generation of the fifteenth analysis program BP15 described above, explanation will be made along the flowchart illustrated in FIG. 11, but explanation of some processing may be omitted or simplified in some cases.

In a case where name information of "Printed at" is selected on the item selection screen G51 of the fifth user interface UI5 illustrated in FIG. 10 (Step SD1), the control server controller 40 displays the same user interface as the sixth user interface UI6 (see FIG. 12) for the issue date and time information item, (Step SD2).

Then, in a case where a button (corresponding to the button B6*a* in FIG. 12) for instructing generation of the eighth analysis program BP8 in the user interface is selected, the control server controller 40 controls the control server displayer 43 to display the ninth user interface UI9 on the display panel.

Figure 17A:
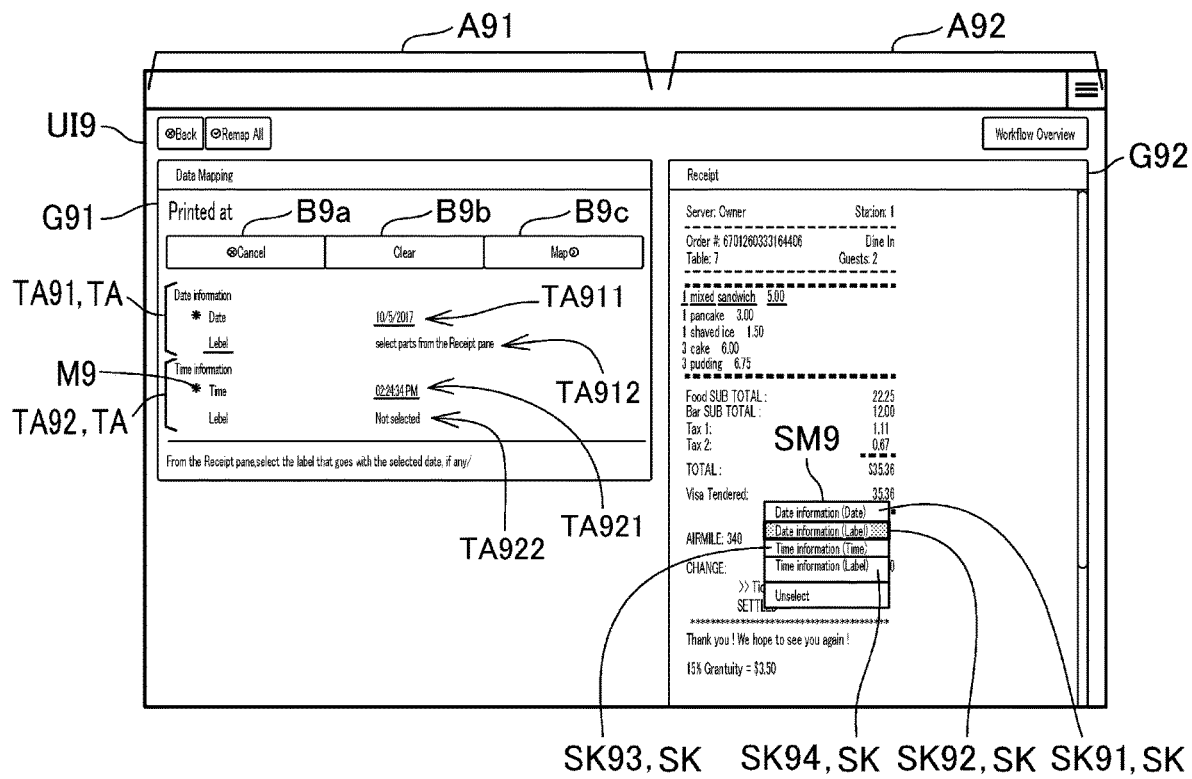
FIG. 17A is a view illustrating an example of a ninth user interface.

FIG. 17A is a view illustrating an example of the ninth user interface UI9.

As illustrated in FIG. 17A, the ninth user interface UI9 includes a setting area A91 and a text display area A92.

In the text display area A92, a text display screen G92 is displayed. The text display screen G92 is the same screen as the text display screens G62 and G72, and print text data is displayed on the text display screen G92.

In the setting area A91, a setting screen G91 is displayed.

The setting screen G91 includes buttons B9*a* to B9*c* similar to the buttons B7*a* to B7*c* included in the seventh interface UI7 illustrated in FIG. 13, a text setting area TA91 (TA), and a text setting area TA92 (TA).

The text setting area TA91 includes an item value text area TA911 for displaying the item value text selected and set from the print text data displayed on the text display screen G92 for the issue date (year, month, day) among the issue date and time. In FIG. 17A, the item value text area TA911 in the case where item value text indicating "10/5/2017" is set is illustrated.

The text setting area TA92 includes an item name text area TA912 for displaying the item name text selected and set from the print text data displayed on the text display screen G92 for the issue date among the issue date and time. In FIG. 17A, the item name text area TA912 in a case where the item name text is not set is illustrated. For that reason, in the item name text area TA912 of FIG. 17A, information ("select parts from the Receipt pane") instructing setting of the item name text is displayed.

The text setting area TA92 includes an item value text area TA921 for displaying the item value text selected and set from the print text data displayed on the text display screen G92 for the issue time (hours, minutes, seconds) among the issue date and time. In FIG. 17A, the item value text area TA921 in the case where the item value text indicating "02:24:34 PM" is set is illustrated.

The text setting area TA92 includes an item name text area TA922 for displaying the item name text selected and set from the print text data displayed on the text display screen G92 for the issue time among the issue date and time. In FIG. 17A, the item name text area TA922 in a case where the item name text is not set is illustrated. For that reason, in the item name text area TA922 of FIG. 17A, information (not selected) indicating that the item name text is not set is displayed.

In FIG. 17A, since a state in which the item name text area TA912 is selected is indicated, information for instructing setting of the item name text is displayed in the item name text area TA912, but in a state where the item name text area TA922 is selected, information for instructing setting of the item name text is displayed in the item name text area TA922 and information indicating that the item name text is not set in the item name text area TA912 is displayed.

In the text setting area TA91 and the text setting area TA92, a mark M9 (for example, an asterisk) indicating that it is an essential item is displayed for items for which setting is essential at the time of generation of the eighth analysis program BP8. In the example of FIG. 17A, the mark M9 is displayed in association with the item value text areas TA911 and TA921. With this, the user can easily and intuitively recognize items for which setting is essential at the time of generation of the eighth analysis program BP8.

Hereinafter, the case of setting the item name text of the issue date will be described.

The setting menu SM9 in FIG. 17A includes an item value setting item (item value) SK91 ("Date information (Date)") for setting the selected extraction item related text as item value text of the issue date, an item name setting item (item name) SK92 ("Date information (Label)") for setting the selected extraction item related text as item name text of the issue date, an item value setting item (item value) SK93 ("Time information (Time)") for setting the selected extraction item related text as item value text of the issue time, and an item name setting item (item name) SK94 ("Time information (Label)") for setting the selected extraction item related text as item name text of issue time.

When the item value setting item SK91 is selected from the setting menu SM9 in a state where "10/5/2017" is selected as the extraction item related text in the print text data, the control server controller 40 sets the extraction item related text "10/5/2017" as the item value text of the issue date, and displays "10/5/2017" in the item value text area TA911 as illustrated in FIG. 17A (Steps SD3 to SD7).

Similarly, when the item value setting item SK93 is selected from the setting menu SM9 in a state where "02:24:34:PM" is selected as the item value related text in the print text data, the control server controller 40 sets the extraction item related text "02:24:34:PM" as the item value text of the issue time, and displays "02:24:34:PM" in the item value text area TA921 as illustrated in FIG. 17A (Steps SD3 to SD7).

In FIG. 17A, a state where the character string "SETTLED" in the print text data displayed on the text display screen G92 is selected as the extraction item related text is illustrated. In this state, for example, when a right click operation of the mouse by the user is performed, the control server controller 40 displays the setting menu SM9. When the item name setting item SK92 is selected from the setting menu SM9, the control server controller 40 sets the selected extraction item related text ("SETTLED") as the item name text of the issue date, and displays the character string "SETTLED" in the item name text area TA912 (Steps SD3 to SD7). FIG. 17A illustrates a state where the item name setting item SK92 is selected from the setting menu SM9 (a state before the character string "SETTLED" is set as the item name text and displayed).

The control server controller 40 generates an extraction condition based on the setting contents which are set in the ninth user interface UI9 (Step SD9). For example, in a case where the character string "SETTLED" is set as the item name text of the issue date and the item name text of the issue time, the control server controller 40 generates the following extraction condition.

Extraction Condition of Item Value Text of Issue Date: Item value text of the issue date is text indicating a character string which is in the same line as the character string "SETTLED", which is positioned behind (right side in FIGS. 17A and 17B) the character string of "SETTLED" and one space character, and which is positioned between the one space character and a second space character.

The text (second text) that matches the extraction condition is text of a character string "10/5/2017" in print text data displayed on the text display screen G92.

Extraction Condition of Item Value Text of Issue Time: Item value text of the issue time is text indicating a character string which is in the same line as the character string "SETTLED", which is positioned after the string of "SETTLED" (right side in FIGS. 17A and 17B) and which is a character string (including space character) after the second space character.

The text (second text) that matches the extraction condition is the text of the character string "02:24:34 PM" in the print text data displayed on the text display screen G92.

In a case where the button B9c in which a character string "Map" is displayed is selected in FIG. 17A, the control server controller 40 executes a trial of analysis processing of the print text data based on the generated extraction condition (Step SD10). Then, the control server controller 40 displays the trial result on the tenth interface UI10 to be described later (Step SD11).

Here, as the item value text of "10/5/2017", two formats of a format A of "MM/D (or DD)/YYYY" (MM: month/DD: day/YYYY: year) or a format B of "DD/M (or MM)/YYYY" can be considered. As such, in a case where a plurality of formats (conversion candidates) are present, it is necessary to clarify the meaning represented by the extracted item value text by applying any one of the formats. The control server controller 40 displays the trial result by the tenth user interface UI10 and allows the user to select which format to adopt (which format is correct).

Figure 17B:
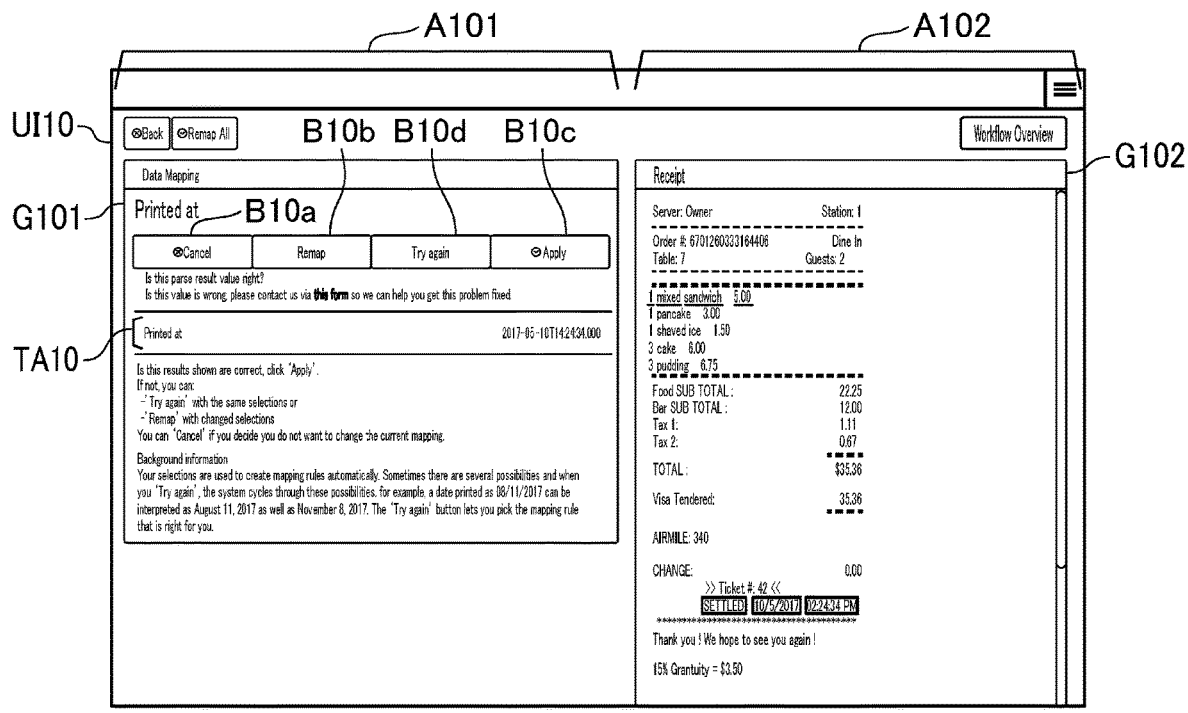
FIG. 17B is a view illustrating an example of a tenth user interface.

FIG. 17B is a view illustrating an example of the tenth user interface UI10.

As illustrated in FIG. 17B, the tenth user interface UI10 includes a result area A101 and a text display area A102.

In the text display area A102, a text display screen G102 is displayed. The text display screen G102 is the same screen as the text display screens G62, G72, and G92. Further, the text display screen G102 displays the item name text used as a search keyword in the trial and the extracted item value text in a mode (for example, highlight) different from other texts.

In the result area A101, a result screen G101 is displayed.

The result screen G101 includes buttons B10a to B10c, similar to the buttons B8a to B8c included in the eighth user interface UI8 illustrated in FIG. 16, a button B10d, and a trial result area TA10.

The button B10d is a button for instructing retry. When the button B10d is selected (for example, clicked with a mouse), the control server controller 40 tries analysis processing of the print text data and displays the trial result in the trial result area TA10. In this case, the control server controller 40 applies a format different from the format applied in the previous trial to the extracted item value text. For example, in a case where the format A is applied to the item value text "10/5/2017" on the previous trial and set the item value text "10/5/2017" to "Oct. 5, 2017", the format B is applied to the item value text "10/5/2017" at the current trial and sets the item value text "10/5/2017" to "May 10, 2017".

Similarly, in a case where there are three or more formats that can be adopted, the formats to be applied is changed in order every time the trial is performed. For example, in a case where three formats are present, the format to be adopted is changed every time a trial is performed in the order of format A, format B, format C, format A, . . . .

In the trial result area TA10, trial result information indicating a trial result is displayed. In FIG. 17B, "2017-05-10T14:24:34:000" as the trial result information is displayed in the trial result area TA10. The control server controller 40 analyzes that the extracted item value text "10/5/2017" means May 10, 2017, displays the "10/5/2017" as "2017-05-10", analyzes that the extracted item value text "02:24:34 PM" means twenty-four minutes and thirty-four seconds after two o'clock PM, converts the 12-hour notation to the 24-hour notation, and adds a symbol T representing the time and displays "T14:24:34:000".

When trial result information is displayed in the trial result area TA10, the control server controller 40 displays the issue date and issue time, for example, in a display format designated by the user in advance. That is, a format (conversion format) to be applied to the extracted item value text and a display format to be applied when trial result information is displayed in the trial result area TA10 are not necessarily the same but may be different from each other. In the record to be recorded in the analysis data management database 422, for example, the same format (recording format) as the display format displayed in the trial result area TA10 is adopted.

For example, in a case where the button B10d is selected, the control server controller 40 determines to change the analysis condition. In a case where it is determined that the analysis condition is to be changed (YES in Step SD13), the control server controller 40 again tries and displays other conversion candidates in order (Step SD14). For example, the control server controller 40 displays trial result information "2017-10-05T14:24:34:000" indicating "twenty-four minutes and thirty-four seconds after two o'clock PM on Oct. 5, 2017" as another conversion candidate.

In a case where it is determined that the analysis condition is not to be changed (NO in Step SD13), the control server controller 40 determines whether or not to confirm the trial analysis program as the eighth analysis program BP8 (Step SD14). When the button B10c is selected (for example, clicked with a mouse) by the user, the control server controller 40 determines to confirm the trial analysis program as the eighth analysis program BP8 (YES in Step SD15) and applies the confirmed eighth analysis program BP8 to the analysis program group BPG (Step SD16). Here, when the eighth analysis program BP8 is confirmed, the control server controller 40 confirms the trial analysis program including the analysis condition applied in the previous trial as the eighth analysis program BP8.

In the embodiment, the analysis conditions to be applied to the eighth analysis program BP8 are the following conditions.

Analysis Condition for Item Value Text Representing Issue Date: The item value text representing the issue date to be converted into the format of "YYYY-MM-DD" is configured in the format of "MM (or M)/DD (or D)/YYYY".

Analysis Condition for Item Value Text Represented by Extraction Item Value Of Issue Time: The item value text representing the issue time to be converted into the format of the 24-hour notation "THH:MM:SS:000" (T represents the time, H: hour, M: minute, S: second) is configured in the format of 12-hour notation "HH:MM:SS (space character) AM or PM)".

Based on these analysis conditions, the item value text indicating the issue date is converted into the format of "YYYY-MM-DD", and the item value text indicating the issue time is converted into the format of "HH:MM:SS:000" (24-hour notation). Then, an item value in the format of "YYYY-MM-DDTHH:MM:SS:000" obtained by combining these formats is acquired as issue date and time information J5.

As such, in a case where there are a plurality of conversion candidates, the control server controller 40 sequentially displays the conversion candidates every time the trial is performed, receives selection of the conversion candidates, and generates the analysis condition based on the selected conversion candidate.

The control server controller 40 extracts the item value text (second text) based on the generated extraction condition, and converts the item value text based on the generated analysis condition. Accordingly, the control server controller 40 can extract the item value text indicating the issue date and time information J5 from the print text data by the eighth analysis program BP8, convert the item value text into a format that the user can utilize, and provide the converted item value text as the item value.

Generation of Ninth Analysis Program

A case where the ninth analysis program BP9 is generated will be described. Similar to generation of the fifteenth analysis program BP15 the described above, description will be made along the flowchart illustrated in FIG. 11, but description of some processing may be omitted or simplified in some cases.

In a case where the name of "Products" is selected on the item selection screen G51 of the fifth user interface UI5 illustrated in FIG. 10 (Step SD1), the control server controller 40 displays the same user interface as the sixth user interface UI6 (see FIG. 12) for the commodity information item (Step SD2).

In a case where the button (corresponding to the button B6a in FIG. 12) for instructing generation of the ninth analysis program BP9 in the user interface is selected, the control server controller 40 controls the control server displayer 43 to display the eleventh user interface UI11 on the display panel.

Figure 18:
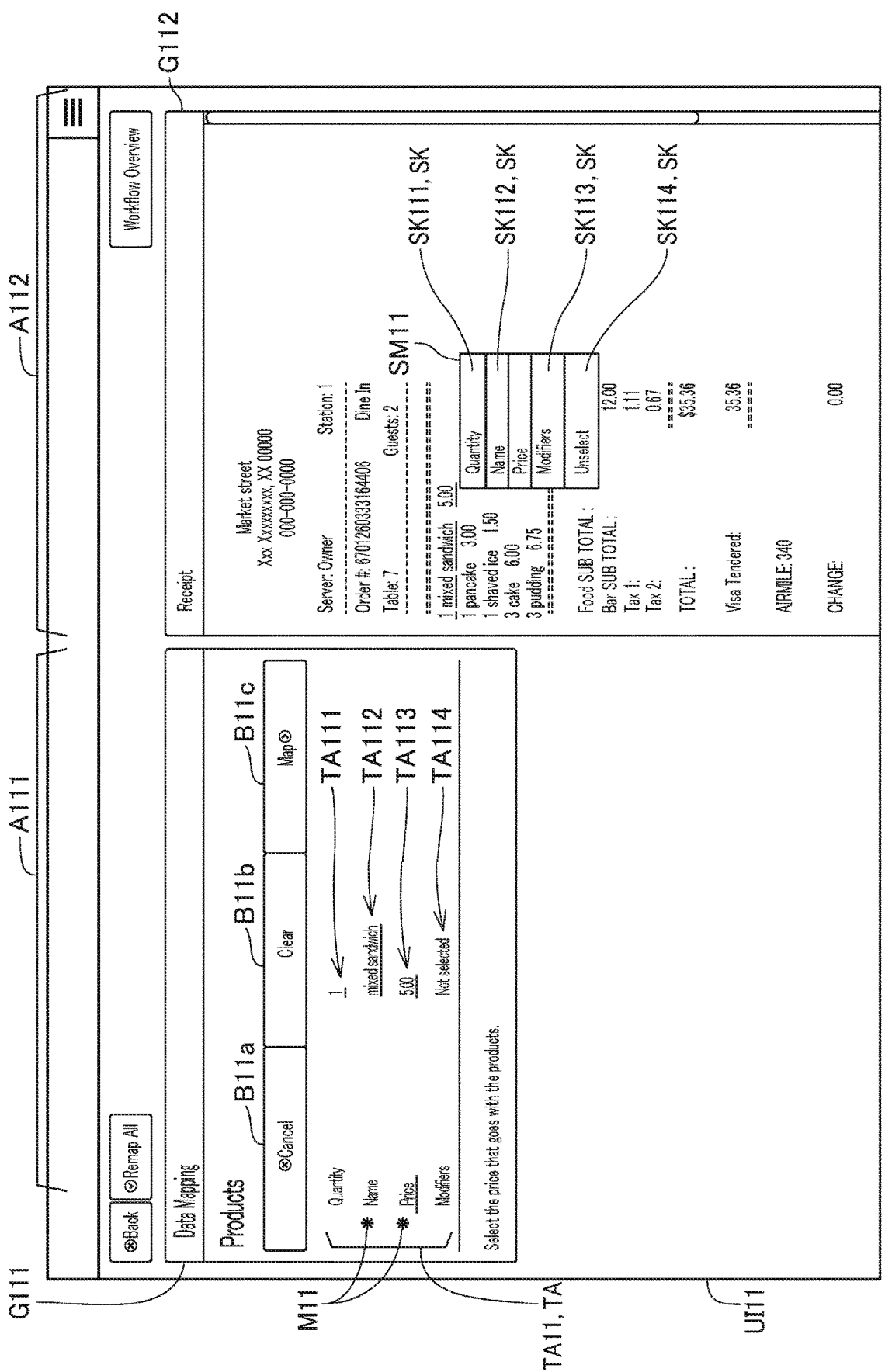
FIG. 18 is a view illustrating an example of an eleventh user interface.

FIG. 18 is a view illustrating an example of the eleventh user interface UI11.

As illustrated in FIG. 18, the eleventh user interface UI11 includes a setting area A11 and a text display area A112.

In the text display area A112, a text display screen G112 is displayed. The text display screen G112 is the same screen as the text display screens G62 and G72.

In the setting area A11, a setting screen G111 is displayed.

The setting screen G111 includes buttons B11a to B11c similar to the buttons B7a to B7c of the seventh interface UI7 illustrated in FIG. 13 and text setting area TA11 (TA).

The text setting area TA11 includes an item value text area TA111 for displaying the item value text selected and set from the print text data displayed on the text display screen G112, for the purchase quantity. In FIG. 18, the item value text area TA111 in the case where the item value text indicating "1" is set is illustrated.

The text setting area TA11 includes an item value text area TA112 for displaying the item value text selected and set from the print text data displayed on the text display screen G112, for the commodity name. In FIG. 18, an item value text area TA112 in the case where an item value text indicating "mixed sandwich" is set is illustrated.

The text setting area TA11 includes an item value text area TA113 for displaying the item value text selected and set from the print text data displayed on the text display screen G112, for unit price. In FIG. 18, an item value text area TA113 in the case where the item value text indicating "5.00" is set is illustrated.

The text setting area TA11 includes an item value text area TA114 for displaying the item value text selected and set from the print text data displayed on the text display screen G112, for incidental information. The incidental information is information incidental to the commodity, for example, information on ingredients topped in pizza (commodity). In FIG. 18, the item value text area TA114 in a case where the item value text is not set is illustrated.

In the text setting area TA11, a mark M11 (for example, an asterisk) indicating that it is an essential item is displayed for items for which setting is essential at the time of generation of the ninth analysis program BP9. In the example of FIG. 18, the mark M11 is displayed in association with the item value text areas TA112 and TA113. With this, the user can easily and intuitively recognize items for which setting is essential at the time of generation of the ninth analysis program BP9.

Also, when the ninth analysis program BP9 is generated, in a case where the item value text is set, the control server controller 40 displays the setting menu. The setting menu SM11 in FIG. 18 includes an item value setting item (item value) SK111 ("Quantity") for setting the selected extraction item related text as the item value text of the purchase quantity, an item value setting item (item value) SK112 ("Name") for setting the selected extraction item related text as the item value text of the commodity name, an item value setting item (item value) SK113 ("Price") for setting the selected extraction item related text as the item value text of the unit price, and an item value setting item (item value) SK114 ("Modifiers") for setting selected extraction item related text as item value text of incidental information.

When the item value setting item SK111 is selected from the setting menu SM11 in a state where "1" is selected as the extraction item related text in the print text data, the control server controller 40 sets the extraction item related text "1" as the item value text of the purchase quantity, and displays "1" in the item value text area TA111 as illustrated in FIG. 18 (Steps SD3 to SD7).

Similarly, when the item value setting item SK112 is selected from the setting menu SM11 in a state where "mixed sandwich" is selected as extraction item related text in the print text data, the control server controller 40 sets the extraction item related text "mixed sandwich" as the item value text of the commodity name, and displays "mixed sandwich" in the item value text area TA112 as illustrated in FIG. 18 (Steps SD3 to SD7).

Similarly, when the item value setting item SK113 is selected from the setting menu SM11 in a state where "5.00" is selected as the extraction item related text in the print text data, the control server controller 40 sets the extraction item related text "5.00" as the item value text of the unit price, and displays "5.00" in the item value text area TA113 as illustrated in FIG. 18 (Steps SD3 to SD7).

The control server controller 40 generates an extraction condition based on the setting contents which are set in the eleventh user interface UI11 (Step SD9). The control server controller 40, for example, generates the following extraction condition based on the set item value text.

Extraction condition: For one line of a fourth group G4, an item value text indicating purchase quantity information J61 is text indicating a character string (number) positioned at the most forward (left side in FIG. 18), an item value text indicating unit price information J63 is text indicating a character string (including a number and a comma) positioned at the most rearward (right side in FIG. 18), and an item value text indicating commodity name information J62 is text indicating a character string positioned between the purchase quantity information J61 and the unit price information J63.

Here, a "group" will be described.

Figure 19:
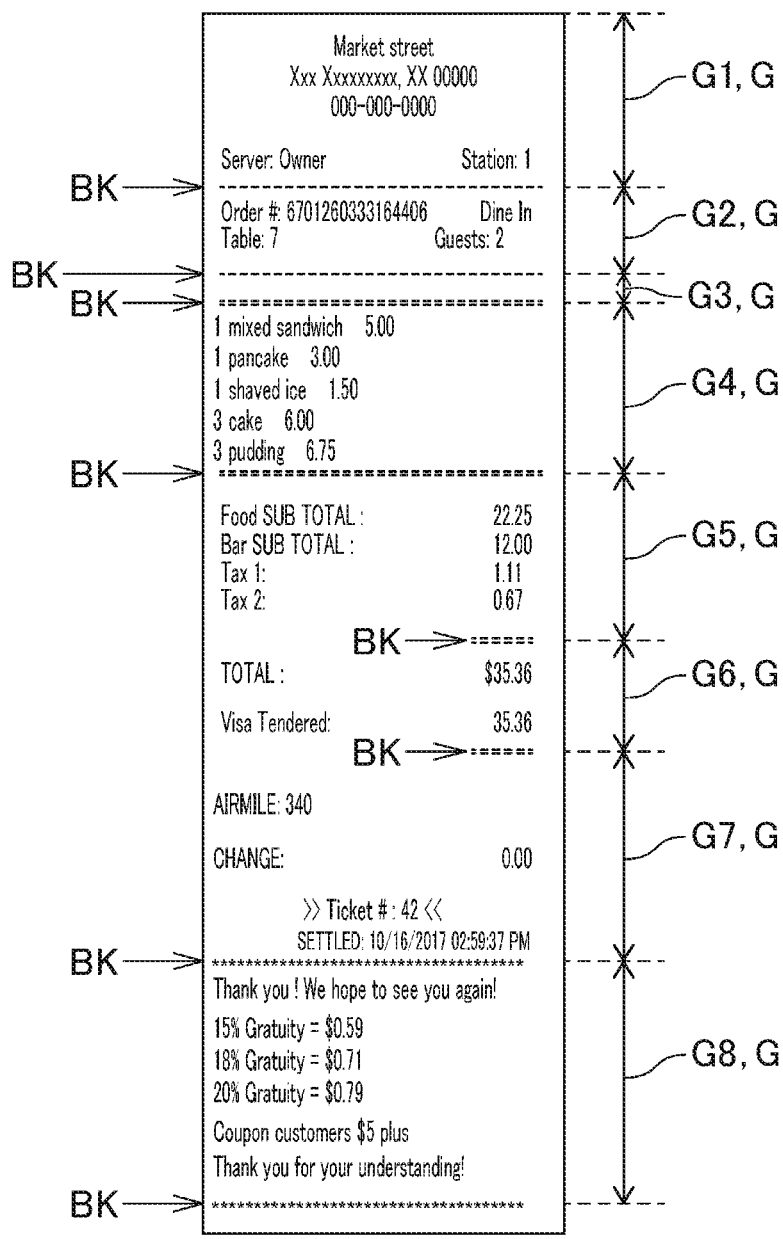
FIG. 19 is a view for explaining generation of an extraction condition.

FIG. 19 is a diagram for explaining generation of an extraction condition.

Print text data illustrated in FIG. 19 is the same as the print text data displayed at the eleventh user interface UI11 in FIG. 18. As illustrated in FIG. 19, the print text data is divided into eight groups G of a first group G1 to an eighth group G8. In the embodiment, the "group" is a concept indicating a division unit when one print text data is divided according to a predetermined criterion.

In FIG. 19, the print text data is divided into eight groups G based on area division information BK.

The criterion for dividing print text data into "groups" is not limited to the area division information BK, and other criteria may be adopted. For example, print text data may be divided for every predetermined number of lines, or may be divided on the basis of a predetermined character or symbol.

Under the extraction condition described above, when the print text data is divided in the row direction as illustrated in FIG. 19 according to predetermined criteria, text existing in the fourth group is set as a target to be extracted. As such, when the print text data is divided into a plurality of groups G, the control server controller 40 sets the position of the group G to which the item value text for the position of the other group G belongs as a relative position of the item value text, and generates an extraction condition based on the relative position. With this, the control server controller 40 can generate an extraction condition reflecting the layout of the print text data, and can accurately extract item value text.

In FIG. 18, in a case where the button B11c in which the character string "Map" is displayed is selected, the control server controller 40 executes a trial of analysis processing of the print text data based on the generated extraction condition (Step SD10) and display the trial result on the same user interface as the eighth user interface UI8 (see FIG. 16) (Step SD11). When a button corresponding to the button B8c is selected by the user, the control server controller 40 confirms a trial analysis program having the generated extraction condition as the ninth analysis program BP9 (Step SD15).

By the generated ninth analysis program BP9, the control server controller 40 accurately extracts the item value text indicating the commodity information J6 (each of purchase quantity information J61, commodity name information J62, and unit price information J63) from the print text data.

The extraction condition to be applied to the analysis programs BP15, BP8, and BP9 described above includes a position of the item value text with respect to the position of the item name text, or a position of the group G to which the item value text with respect to the position of another group G belongs, as the relative position of the item value text in the print text data. However, it is also possible to extract the item value text from print text data without using the relative position.

Attribute of Item Value Text

For example, when the eighth analysis program BP8 is generated, it is assumed that the extraction item related text "10/5/2017" is set as item value text in the text setting area TA9 of the ninth user interface UI9 (see FIG. 17A) and the item name text "SETTLED" is not set. In this case, the control server controller 40 generates the following extraction condition.

Extraction Condition of Item Value Text of Issue Date: The item value text of the issue date is text indicating a character string including two slashes (oblique line) "/" in the print text data.

The text (second text) matching this extraction condition is text indicating the character string "10/5/2017" in the print text data illustrated in FIG. 19. This extraction condition may be "text indicating a character string composed of numbers including two "/(slash (oblique line))". Furthermore, the extraction condition may be text which specifies the number of characters and indicates a character string composed of a format of "one-digit number or two-digit number/(slash)one-digit number or two-digit number/(slash) four-digit number".

As such, the control server controller 40 generates the extraction condition based on an attribute (format, character type, and the like) of the set item value text. With this, the user can generate the extraction condition (analysis program BP) by a simple operation of setting the item value text from the print text data. Even in a case where only the item value text is set, an extraction condition based on the attribute of the item value text can be generated, and the control server controller 40 can accurately extract the item value text from the print text data.

An attribute of the item value text may be added as an extraction condition applied to the fifteenth analysis program BP15 corresponding to the total amount information item described above. For example, it is possible to extract more accurately by including the symbol "$" at the beginning and making it a character string composed of the number ("0 to 9") and the symbol ". (dot)" or ", (comma)".

As an extraction condition to be applied to the eighth analysis program BP8 corresponding to the issue date and time information item, an attribute of the item value text may be added. For example, it is possible to extract more accurately by adding a format of "Two-digit number: (colon) two-digit number: (colon) two-digit number (one space character) alphabet of PM or AM" as an extraction condition.

Other Example 1 of Relative Position

For example, it is assumed that in the text setting area TA91 of the ninth user interface UI9 (see FIG. 17A) for generating the eighth analysis program BP8, the extraction item related text indicating "10/5/2017" is set as the item value text of the issue date, the extraction item related text indicating "02:24:34 PM" is set as the item value text of the issue time in the text setting area TA92, and none of the item name texts are set. In this case, the control server controller 40 generates the following extraction condition based on a position of item value text for peculiar text.

In the embodiment, the peculiar text indicates text composed only of special characters, and text composed of special characters and ordinary characters. The peculiar text in the print text data illustrated in FIG. 19 is, for example, area division information BK, text indicating ">>Ticket#: 42<<", and the like.

Extraction condition: The item value text of the issue date and time information item is text described one line below the text indicating ">>Ticket#:42<<" and includes a number.

Or, Extraction condition: The item value text of the issue date and time information item is text described one line above the text indicating the area division information BK composed of "*" in the seventh group G7, and includes a number.

As such, the control server controller 40 generates the extraction condition based on the position of the item value text for the peculiar text. With this, the user can generate the extraction condition (analysis program BP) by a simple operation of setting the item value text from the print text data. Even in a case where only the item value text is set, an extraction condition can be generated based on the position of the item value text for the peculiar text, and the control server controller 40 can accurately extract the item value text from the print text data.

Other Example 2 of Relative Position

Similarly to other example 1 of the relative position described above, in a case where the item value text of the issue date and the item value text of the issue time is set, the control server controller 40 generates the following extraction condition based on the position of the item value text with respect to the issue date, as the extraction condition for extracting the issue time.

Extraction condition: The item value text of the issue time is text indicating a character string that is positioned in the same line as the issue date is consecutive to one space character positioned after the issue date (right side in FIGS. 17A and 17B).

As such, the control server controller 40 can also generate the extraction condition based on the position of the item value text, which is an extraction target, with respect to another item value text.

As described above, even in a case where only the item value text is set, the control server controller 40 generates an extraction condition based on at least one of the attribute of the item value text or the relative position with respect to the peculiar text or another item value text. For that reason, even in a case where only the item value text is set, the control server controller 40 can generate an extraction condition with which the item value text can be accurately extracted from the print text data.

Even in a case where the item name text is set, the control server controller 40 may generate an extraction condition taking account of any one or a plurality of conditions of the attribute of the item value text, the relative position to the peculiar text, the relative position to another item value text, the relative position of the other group to the group to which the item value text belongs. In this case, the control server controller 40 can generate extraction conditions with which the item value text can be more accurately extracted from the print text data.

As described above, the control server 15 (information processing device) can extract text (second text) that matches the extraction condition from print text data (data) in which receipt information to be printed on roll paper (printing medium) is described in text. The control server 15 includes the control server controller 40 (processor) that receives selection of the extraction item related text (first text) from among the print text data after print text data is displayed on the user interface (screen) corresponding to the layout to which the receipt information is printed on roll paper, receives selection of the setting item SK after the plurality of setting items SK are displayed as the setting menus (SM7a, SM9, and SM11) in a state where the extraction item related text is selected, in a case where the item value setting item is selected, the setting item SK containing the item value setting item (item value) (SK71, SK91, SK93, and SK111 to SK114), sets the extraction item related text as item value text (first text), generates an extraction condition for extracting the item value text (second text) from the print text data based on at least one of the relative position of the item value text in the print text data and the attribute of the item value text, and extracts text matching the generated extraction condition as the item value text (second text).

According to this configuration, the user can generate an extraction condition by performing a simple operation of selecting the item value setting item (item value) from the setting menu and setting the extraction item related text (first text) as the item value text. That is, for extraction of the item value text (second text) by the control server 15, it is possible to simplify the operation to be performed by the user.

When the print text data is divided into a plurality of groups G, the control server controller 40 generates the extraction condition using the position of the group G to which the item value text (first text) belongs with respect to the position of the other group G as the relative position.

According to this configuration, since the control server controller 40 generates the extraction condition using the position of the group G to which the item value text belongs with respect to the position of the other group G as the relative position when the print text data is divided into the plurality of groups G, the control server controller 40 can accurately extract the item value text (second text) by reflecting the layout of the print text data by extracting the item value text based on this extraction condition at the time of extraction of the item value text.

The control server controller 40 generates an extraction condition by using the position of the item value text (first text) with respect to peculiar text included in the print text data as the relative position.

According to this configuration, since the control server controller generates the extraction condition by using the position of the item value text with respect to the peculiar text as the relative position, the control server controller 40 can accurately extract the item value text (second text) from the print text data by reflecting the layout of the print text data by extracting the item value text based on this extraction condition at the time of extraction of the item value text is extracted.

The control server controller 40 receives selection of the extraction item related text (third text) relating to an extraction item from among the print text data after print text data is displayed, receives selection of the setting item SK after the setting menu is displayed in a state where the extraction item related text is selected, in a case where the item name setting item is selected, the setting item SK containing the item name setting item (item name) (SK71, SK92, or SK94), sets the extraction item related text as the item name text (third text), and generates a new extraction condition for extracting the item value text (second text) from the print text data by using the position of the item value text (first text) with respect to the position of the item name text (third text) as the relative position.

According to this configuration, since the control server controller 40 generates the extraction condition by using the position of the item value text with respect to the position of the item name text as the relative position of the item value text in the print text data, it is possible to accurately extract item value text (second text) from the print text data by reflecting the layout of the print text data by extracting the item value text based on this extraction condition at the time of extraction of the item value text extracted.

The control server controller 40 tries to extract the item value text (second text) from the print text data based on the generated extraction condition. In a case where a plurality of conversion candidates are present at the time of conversion of the item value text extracted by trial to a predetermined format, the control server controller 40 sequentially displays the conversion candidates, receives selection of the conversion candidate, generates an analysis condition which is a condition for converting the item value text into a predetermined format based on the selected conversion candidate, every time a trial is performed.

According to this configuration, since the control server controller 40 displays the conversion candidates, receives selection of the conversion candidate, and generates the analysis condition based on the selected conversion candidate, every time a trial is performed to extract the item value text, it is possible to convert the extracted item value text (second text) into an appropriate format desired by the user.

The control server controller 40 includes a control server network communicator 41 (connector) that is communicably connected to the print device 12. The control server controller 40 acquires the print text data relating to the receipt printed by the print device 12 from the print device 12.

According to this configuration, the control server controller 40 can simplify the operation to be performed by the user for extraction of the item value text (second text) from the print text data relating to the receipt printed by the print device 12.

The extraction item value (first text) is one of a value (that is, item value indicating issue date and time information J5) indicating the issue date and time (date), a value (that is, item value indicating total amount information J92) indicating the total amount, and a value (each item value indicating commodity information J6) indicating information on the commodity.

According to this configuration, it is possible to simplify the operation to be performed by the user for extraction of the item value text (second text) that indicates any one of the value indicating the issue date and time, the value indicating the total amount, or the value indicating information on the commodity.

In the embodiment described above, merely one embodiment of the invention is illustrated, and any modification and application may be made thereto within the scope of the invention.

For example, the extraction items are not limited to those described above, as long as they can be items from which item value text can be extracted from a receipt.

Although print text data is generated by the print device 12, the print text data may be generated by the control server 15 or other image processing device. For example, image data obtained by reading a receipt printed by the print device 12 with an image scanner may be converted into text data by an optical character recognition/reader (OCR) and used as print text data.

For example, in a case where the control method of the control server 15 (the control method of the information processing device) described above is realized by using a computer included in the control server 15 or an external device connected to the control server 15, the invention may be configured in the form of a program executed by a computer to realize the method, a recording medium on which the program is recorded so that the program can be read by a computer, or a transmission medium for transmitting the program. As the recording medium, a magnetic or optical recording medium or a semiconductor memory device can be used. Specifically, as the recording medium, a portable recording medium such as a flexible disk, an hard disk drive (HDD), a compact disk read only memory (CD-ROM), a digital versatile disk (DVD), a Blu-ray (registered trademark) Disc, a magneto-optical disk, a flash memory, a card type recording medium or the like, or a fixed type recording medium is included. The recording medium may be a nonvolatile storage device such as a random access memory (RAM), a read only memory (ROM), an HDD, or the like which is an internal storage device provided in the control server 15 or an external device connected to the control server 15.

The functions of the control server controller 40 can be realized in the form of a storage medium storing a program, a server device that distributes the program, a transmission medium that transmits the program, a data signal embodying the program in a carrier wave, and the like. As the storage medium, various types of media capable of being read by a computer can be used, and may be any medium using a magnetic or optical storage medium or a semiconductor memory device, and other types of storage media may be used. The storage medium may be a portable storage medium such as a memory card. Further, the storage medium may be a storage medium included in a device connected to the device described above via a communication line. The program described above can be installed as a stand-alone application program that runs on the operating system in a device operating with an operating system. The program is not limited to the stand-alone application program, but may be installed as a plurality of functions among an operating system, a device driver, and an application program. For example, a configuration in which a device driver program for controlling an operation device including an operation surface and/or a program module for receiving operation of the operation device in an operating system cooperate to realize the program may be adopted. A configuration in which the program described above of the invention is realized by a plurality of application programs may be adopted, and any specific program form is available.

For example, processing units of FIG. 3 and FIG. 11 are obtained by dividing processing in accordance with main processing contents in order to make processing of the POS terminal 13, the print device 12, and the control server 15 easy to understand, the invention is not limited by the manner and name of division of the processing units. Depending on the processing contents, processing may be divided into many processing units further. Also, the processing may be divided so that one processing unit includes more processing. Further, the order of the processing may be appropriately changed within a range that does not cause any problem.

Each functional unit illustrated in FIG. 2 indicates a functional configuration, and a specific installation form is not particularly limited. That is, it is not always necessary to install hardware corresponding to each functional unit individually, but it is of course possible to realize a configuration in which the functions of a plurality of functional units are realized by executing a program by one processor. Some of the functions realized by software in the embodiment described above may be implemented by hardware, or some of the functions realized by hardware may be realized by software. In addition, any alterations may be made to specific detailed configurations of other parts of the POS terminal 13, the print device 12, and the control server 15 without departing from the gist of the invention.

What is claimed is:

1. An information processing device comprising:
a processor configured to
receive selection of first text related to an extraction item from data after the data is displayed, wherein the data is displayed based on a layout on which information is printed on a printing medium, and the information printed on the printing medium is described in text in the data,
receive selection of a setting item after a plurality of setting items corresponding to the extraction item are displayed as a menu in a state where the first text is selected,
generate an item value as an extraction condition for extracting second text from the data based on at least one of a relative position of the first text in the data and an attribute of the first text in a case where the item value is selected, the item value being contained in the setting item, wherein a position of the first text with respect to a peculiar text included in the data is used as the relative position, and
extract text matching the generated extraction condition as the second text from the data.

2. The information processing device according to claim 1,
wherein the processor is configured to generate the extraction condition by using a position of a group to which the first text belongs with respect to a position of another group as the relative position when the data is divided into a plurality of groups.

3. The information processing device according to claim 1,
wherein the processor is configured to
receive selection of third text related to the extraction item from the data after the data is displayed, and
receive selection of the setting item after the menu is displayed in a state where the third text is selected, and generate an item name as the extraction condition for extracting the second text from the data by using a position of the first text with respect to a position of the third text as the relative position in a case where the item name is selected, the item name being contained in the setting item.

4. The information processing device according to claim 1,
wherein the processor is configured to
try to extract the second text from the data based on the generated extraction condition, and
in a case where a plurality of conversion candidates are present when the second text extracted by a trial is converted into a predetermined format, every time the trial is performed, sequentially display the conversion candidates and receive selection of a conversion candidate, and generate an analysis condition that is a condition for converting the second text based on the selected conversion candidate.

5. The information processing device according to claim 1,
wherein the processor is configured to acquire the data relating to a receipt printed by a print device from the print device.

6. The information processing device according to claim 1,
wherein the first text for the extraction item is one of a value indicating a date, a value indicating a total amount, and a value indicating information on a commodity.

7. A control method comprising:
receiving, by a processor of an information processing device, selection of first text related to an extraction item from data after the data is displayed, wherein
the data is displayed based on a layout on which information is printed on a printing medium, and
the information printed on the printing medium is described in text in the data,
receiving, by the processor, selection of a setting item after a plurality of setting items corresponding to the extraction item are displayed as a menu in a state where the first text is selected,
generating, by the processor, an item value as an extraction condition for extracting second text from the data based on at least one of a relative position of the first text in the data and an attribute of the first text in a case where the item value is selected, the item value being contained in the setting item, wherein a position of the first text with respect to a peculiar text included in the data is used as the relative position, and
extracting, by the processor, text matching the generated extraction condition as the second text from the data.

8. The control method according to claim 7, further comprising:
when the extraction condition is generated, dividing, by the processor, the data into a plurality of groups, and
generating, by the processor, the extraction condition by using a position of a group to which the first text belongs with respect to a position of another group as the relative position.

9. The control method according to claim 7, further comprising:
receiving, by the processor, selection of third text related to the extraction item from the data after the data is displayed,
receiving, by the processor, selection of the setting item after the menu is displayed in a state where the third text is selected, and generating, by the processor, an item name as a new extraction condition for extracting the second text from the data by using a position of the first text with respect to a position of the third text as the relative position in a case where the item name is selected, the item name being contained in the setting item.

10. The control method according to claim 7, further comprising:
trying, by the processor, to extract the second text from the data based on the generated extraction condition,
in a case where a plurality of conversion candidates are present when the second text extracted by a trial is converted into a predetermined format, every time the trial is performed, sequentially displaying, by the processor, the conversion candidates and receiving, by the processor, selection of a conversion candidate, and
generating, by the processor, an analysis condition that is a condition for converting the second text based on the selected conversion candidate.

11. The control method according to claim 7, wherein
the information processing device is communicably connected to a print device, and
the control method further comprises acquiring, by the processor, the data relating to a receipt printed by the print device from the print device.

12. The control method according to claim 7,
wherein the item value for the extraction item is one of a value indicating a date, a value indicating a total amount, and a value indicating information on a commodity.

13. A non-transitory computer readable medium storing computer-executable instructions which, when executed by a processor of an information processing device, cause the processor to execute a process, the process comprising:
receiving selection of first text related to an extraction item from data after the data is displayed, wherein
the data is displayed based on a layout on which information is printed on a printing medium, and
the information printed on the printing medium is described in text in the data,
receiving selection of a setting item after a plurality of setting items corresponding to the extraction item are displayed as a menu in a state where the first text is selected,
generating an item value as an extraction condition for extracting second text from the data based on at least one of a relative position of the first text in the data and an attribute of the first text in a case where the item value is selected, the item value being contained in the setting item, wherein a position of the first text with respect to a peculiar text included in the data is used as the relative position, and
extracting text matching the generated extraction condition as the second text from the data.

* * * * *